United States Patent
Hua et al.

(10) Patent No.: US 12,541,823 B2
(45) Date of Patent: Feb. 3, 2026

(54) METHOD OF GENERATING TRAINING DATA AND MEDICAL IMAGE PROCESSING APPARATUS FOR DEEP-LEARNING-BASED MAMMOGRAPHY DENOISING

(71) Applicant: Canon Medical Systems Corporation, Otawara (JP)

(72) Inventors: Rui Hua, Hefei (CN); Haruki Iwai, Otawara (JP); Joseph Manak, Highland Park, IL (US)

(73) Assignee: Canon Medical Systems Corporation, Otawara (JP)

( * ) Notice: Subject to any disclaimer, the term of this patent is extended or adjusted under 35 U.S.C. 154(b) by 394 days.

(21) Appl. No.: 18/063,379

(22) Filed: Dec. 8, 2022

(65) Prior Publication Data

US 2024/0193742 A1 Jun. 13, 2024

(51) Int. Cl.
*G06T 5/70* (2024.01)
*G06T 5/50* (2006.01)
(Continued)

(52) U.S. Cl.
CPC .......... *G06T 5/70* (2024.01); *G06T 5/50* (2013.01); *G06V 10/26* (2022.01); *G16H 30/40* (2018.01);
(Continued)

(58) Field of Classification Search
CPC ... G06T 5/70; G06T 5/50; G06T 2207/20081; G06T 2207/20084; G06T 2207/30068;
(Continued)

(56) References Cited

U.S. PATENT DOCUMENTS 9,519,966 B2  12/2016  Ghouti et al.
9,842,390 B2  12/2017  Syeda-Mahmood
(Continued)

FOREIGN PATENT DOCUMENTS

CN   109035160 B * 6/2022 ............... G06T 5/50

OTHER PUBLICATIONS

Stimpel et al.; "Projection-to-Projection Translation for Hybrid X-ray and Magnetic Resonance Imaging"; arXiv:1911.08163v1 [eess.IV]; Nov. 19, 2019; URL: https://doi.org/10.48550/arXiv.1911.08163.

(Continued)

*Primary Examiner* — Jennifer Mehmood
*Assistant Examiner* — Vaisali Rao Koppolu
(74) *Attorney, Agent, or Firm* — Canon U.S.A., Inc. IP Division

(57) ABSTRACT

Systems and methods are provided for generating training data for training a neural network. The neural network may be a machine learning model. The neural network may be a U-Net neural network. Training data for training a neural network may be generated by combining X-ray image data and non-X-ray image data. Training data for training a neural network may be generated by superimposing data having a characteristic related to a lesion onto X-ray image data. The superimposed data may be used to simulate calcification features in mammographic images. Processing circuitry is configured to perform noise reduction by inputting an input image of a breast into a trained machine-learning model to output an output image in which noise included in the input image is reduced in the output image while leaving a characteristic of a lesion included in the input image undeleted in the output image.

13 Claims, 18 Drawing Sheets

(51) Int. Cl.
*G06V 10/26* (2022.01)
*G16H 30/40* (2018.01)

(52) U.S. Cl.
CPC .............. *G06T 2207/20081* (2013.01); *G06T 2207/20084* (2013.01); *G06T 2207/30068* (2013.01); *G06T 2207/30096* (2013.01)

(58) Field of Classification Search
CPC . G06T 2207/30096; G06T 5/60; G06V 10/26; G16H 30/40; G16H 50/20
See application file for complete search history.

(56) References Cited

U.S. PATENT DOCUMENTS

| | | | |
|---|---|---|---|
| 10,339,695 | B2 | 7/2019 | Petkov et al. |
| 10,970,887 | B2 | 4/2021 | Wang et al. |
| 2019/0095579 | A1 | 3/2019 | Kutra et al. |
| 2019/0197366 | A1* | 6/2019 | Kecskemethy ........ G06T 7/0012 |
| 2019/0251327 | A1* | 8/2019 | Laviola ................ A61B 8/5261 |
| 2020/0342597 | A1* | 10/2020 | Chukka .................. G06T 7/194 |
| 2020/0360312 | A1 | 11/2020 | Hall et al. |
| 2021/0267563 | A1 | 9/2021 | Sattarivand et al. |
| 2021/0334959 | A1 | 10/2021 | Omi et al. |
| 2022/0004838 | A1 | 1/2022 | Didonato et al. |
| 2022/0076410 | A1 | 3/2022 | Georgescu |
| 2022/0107378 | A1* | 4/2022 | Dey ....................... G01R 33/56 |
| 2023/0023042 | A1* | 1/2023 | Bernard ................ G06T 7/0012 |

OTHER PUBLICATIONS

Badano; "In silico imaging clinical trials: cheaper, faster, better, safer, and more scalable"; Trials 22, 64 (2021); Jan. 19, 2021; URL: https://doi.org/10.1186/s13063-020-05002-w.

* cited by examiner

METHOD OF GENERATING TRAINING DATA AND MEDICAL IMAGE PROCESSING APPARATUS FOR DEEP-LEARNING-BASED MAMMOGRAPHY DENOISING

FIELD

The present disclosure relates generally to machine learning and artificial neural networks for removing noise from radiographic images, and more particularly to generating training data for deep-learning-based mammography denoising.

BACKGROUND

Mammography is one of the most popular screening techniques to detect abnormities in breast tissue. It plays an important role in diagnosing diseases such as breast cancer. Like other medical images, noise can cause blurriness in object recognition and data interpretation and cause difficulties in illness diagnosis.

In recent years, reducing noise in medical images using artificial intelligence such as deep learning methods has become popular. Deep learning algorithms can not only reduce noise of the medical images but also enhance the sharpness and contrast of them.

DETAILED DESCRIPTION

Figure 1:
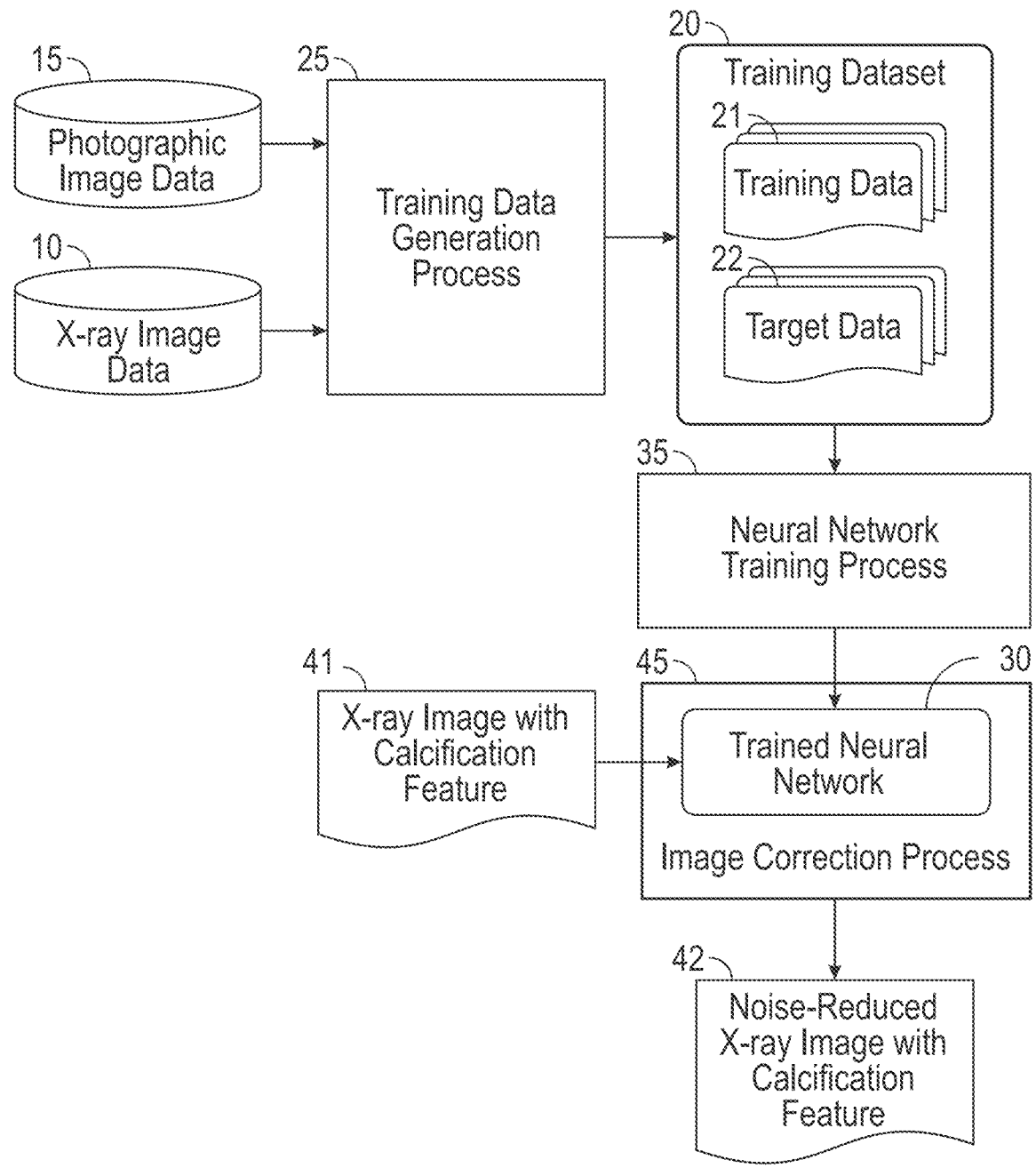
FIG. 1 illustrates an example flow of information in a training data generation process, a neural network training process, and a noise-reduction process according to some embodiments.

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. Furthermore, some embodiments include features from two or more of the following explanatory embodiments. Also, as used herein, the conjunction "or" generally refers to an inclusive "or," although "or" may refer to an exclusive "or" if expressly indicated or if the context indicates that the "or" must be an exclusive "or."

According to some embodiments, a method of generating training data for training a machine-learning model includes obtaining first X-ray image data acquired by irradiating with X-rays a breast of an object, obtaining non-X-ray image data, generating combined image data by combining the first X-ray image data and the non-X-ray image data, and outputting the combined image data as training data for training a machine-learning model for outputting information based on second X-ray image data.

According to some embodiments, a method of generating training data for training a machine-learning model includes obtaining first X-ray image data of a breast of an object, generating superimposed image data by superimposing data having a characteristic related to a lesion onto the first X-ray image data, and outputting the superimposed image data as training data for training a machine-learning model for outputting information based on second X-ray image data.

According to some embodiments, a medical image processing apparatus includes processing circuitry configured to perform noise reduction by inputting an input image of a breast into a trained machine-learning model to output an output image in which noise included in the input image is reduced in the output image while leaving a characteristic of a lesion included in the input image undeleted in the output image. The trained machine-learning model, for reducing noise in an image while leaving a characteristic of a lesion included in the image undeleted, is generated by training a machine-learning model with a first image as training data for an output side of the machine-learning model, and a second image as training data for an input side of the machine-learning model, the first image is generated based on an image of a breast of an object and includes a characteristic of the lesion, and the second image includes higher noise than the first image and includes the characteristic of the lesion included in the first image.

According to some embodiments, a deep learning method is used to reduce noise in mammographic images. For example, in some embodiments, a U-Net neural network is used to reduce noise in an X-ray image input to a trained neural network. In mammographic images, calcification is a critical signal that indicates certain diseases, early breast cancer for example. A fair amount of the micro-calcification are of very small size, which can be much less than 0.5 mm and appear as signals as small as only couple pixels. Therefore, for reducing noise in mammographic images, the task is not only to reduce the noise but also to preserving the critical features such as micro-calcifications to detect any existing problems.

According to embodiments herein, noise in mammographic images can be substantially reduced and the structure of the breast tissue, such as blood tubes and glandular, enhanced. Moreover, sharpness and contrast of calcifications for both single and cluster signals is retained.

FIG. 1 illustrates a flow of information in an example embodiment of a training data generation process, a neural network training process, and a noise-reduction process. The flow of information shown in FIG. 1 is described with reference to FIGS. 2-4.

Figure 2:
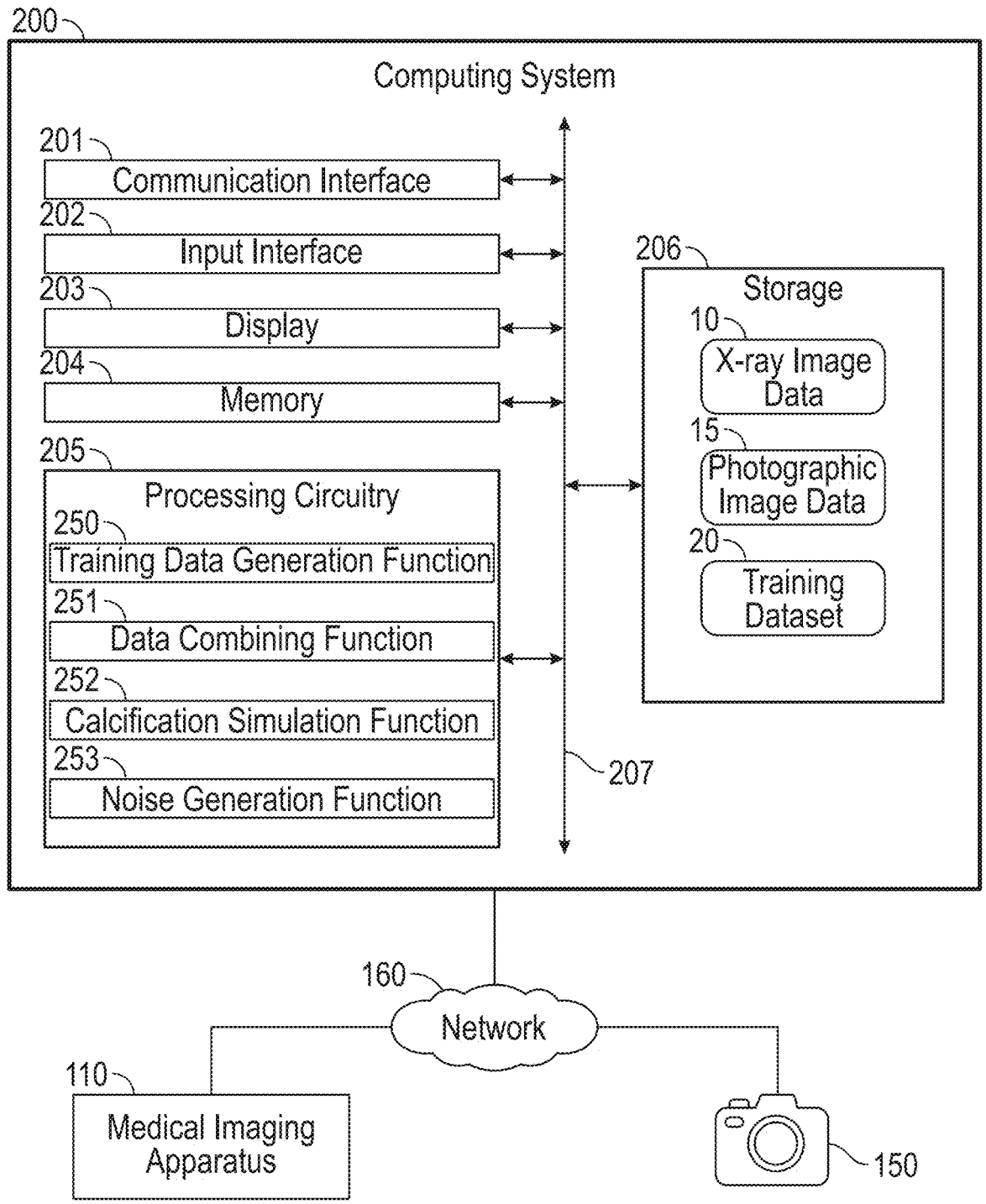
FIG. 2 illustrates an example embodiment of a computing system for generating training data for training a neural network.

In FIG. 1, X-ray image data 10 and photographic image data 15 are used in a training data generation process 25 to generate a training dataset 20 for training a neural network. According to some embodiments, the X-ray image data 10 is acquired by a medical imaging apparatus 110, such as shown in FIG. 2. In some embodiments, the photographic image data 15 is acquired by a camera 150, such as shown in FIG. 2, or other suitable imaging device. According to some embodiments, the X-ray image data 10 includes mammography images of breast tissue acquired by an X-ray diagnostic apparatus. For example, the X-ray image data 10 may be acquired by the medical imaging apparatus 110 of the X-ray diagnostic system 100 illustrated in FIG. 4.

The photographic image data 15 includes photographic images acquired by the camera 150. The camera 150 is an example of an imaging system for obtaining the photographic image data 15, but any suitable device or system may be used that includes hardware, software, or both for providing the functionality for capturing the photographic image data 15.

The training data generation process 25 of FIG. 1 generates training data for use in training a neural network. For example, the training data generation process 25 may include one or more steps of one or more of the processes described herein for generating training data, including, for example, the processes described with reference to FIGS. 6-14. In some embodiments, the computing system 200 of FIG. 2 performs one or more steps of the training data generation process 25. In some embodiments, the steps of the training data generation process 25 are performed by one or more of the computing system 200, the medical imaging apparatus 110, the medical image processing apparatus 140, or a combination of these.

The training dataset 20 of FIG. 1 includes training data 21 and target data 22 suitable for training a neural network. The training dataset 20 is generated by the training data generation process 25. For example, training data may be generated by one or a combination of the processes described with reference to FIGS. 6-14. The training dataset 20 may include the training data illustrated in FIGS. 5A and 5B and/or the training data illustrated in FIGS. 13A and 13B. The training dataset 20 is used in the neural network training process 35 to generate a trained neural network 30. For example, the neural network training process 35 may include one or more steps described with reference to FIG. 15.

Once the neural network training process 35 is complete, the trained neural network 30 may be applied to perform the functions of the trained neural network 30. For example, the trained neural network 30 may perform functionality described with reference to FIG. 19. By applying the trained neural network 30, a scatter profile for projection data may be generated. The projection data may be X-ray image data input to the trained neural network 30. Using the input data, the trained neural network 30 generates (estimates) the scatter profile associated with the input data. The estimated scatter profile may be used in an image correction process, such as described with reference to FIG. 19.

In FIG. 1, the trained neural network 30 is utilized in the image correction process 45 to generate a noise-reduced image. For example, the noise-reduced X-ray image including calcification features 42 is generated based on an X-ray image with calcification features 41 that was input to the trained neural network 30. The X-ray image with calcification features 41 may be an image obtained by, for example, the medical imaging apparatus 110 of FIG. 2 or 4. In some embodiments, the X-ray image with calcification features 41 is obtained from a computing system or data storage system such as a database on a remote server, for example. The processes of FIG. 1, such as the training data generation process, neural network training process, and noise-reduction process, are described in further detail below. According to some embodiments, the trained neural network 30 is utilized in the image correction process 45 to reconstruct an image. For example, estimated scatter profiles generated by applying the trained neural network 30 may be used in an image reconstruction process. By way of example, according to some embodiments, the input X-ray image may be a tomosynthesis mammographic image. Correction of a tomosynthesis image may include image reconstruction using the trained neural network 30, according to some embodiments.

FIG. 2 includes the computing system 200, the medical imaging apparatus 110, the camera 150, and network 160. The computing system 200 includes a communication interface 201, input interface 202, display 203, memory 204, processing circuitry 205, storage 206, and a bus 207. The processing circuitry 205 includes the training data generation function 250, data combining function 251, calcification simulation function 252, and noise generation function 253. The computing system 200 may obtain the X-ray image data 10, for example from the medical imaging apparatus 110 via the network 160, and store the X-ray image data 10 in the storage 206. The computing system 200 may obtain the photographic image data 15, for example from the camera 150 via the network 160, and store the photographic image data 15 in the storage 206. The computing system 200 is configured to generate training data for training a neural network. The computing system 200 may generate the training dataset 20, for example, and store the training dataset 20 in the storage 206. In some embodiments, one or more of the X-ray image data 10, the photographic image data 15, and the training dataset 20 is obtained via the network 160 from another computing system, computer, server, or other suitable device connected to the network 160.

The processing circuitry 205 includes one or more processors. In some embodiments, the processing circuitry 205 includes a processor such as a CPU or GPU. When activating the program installed in the memory 204, the storage 206, or the like, a processor implements a training data generation function 250, data combining function 251, calcification simulation function 252, noise generation function 253, and other functionality. Each of the functions 250-253 is not limited to being realized by a single processing circuitry. A plurality of independent processors may be combined into a processing circuitry, and each of the processors may execute the program to realize the functions 250-253. For example, the processing circuitry 205 may implement the training data generation function 250 to cause the computing system 200 to perform one or more steps described with reference to FIGS. 6-14. The processing circuitry 205 may, for example, implement the data combining function 251 to cause the computing system 200 to perform one or more steps described with reference to FIGS. 6-8. Additionally, the processing circuitry 205 may, for example, implement the calcification simulation function 252 to cause the computing system 200 to perform one or more steps described with reference to FIGS. 9-11. Additionally, the processing circuitry 205 may, for example, implement the noise generation function 253 to cause the computing system 200 to perform one or more steps described with reference to FIG. 14.

Figure 3:
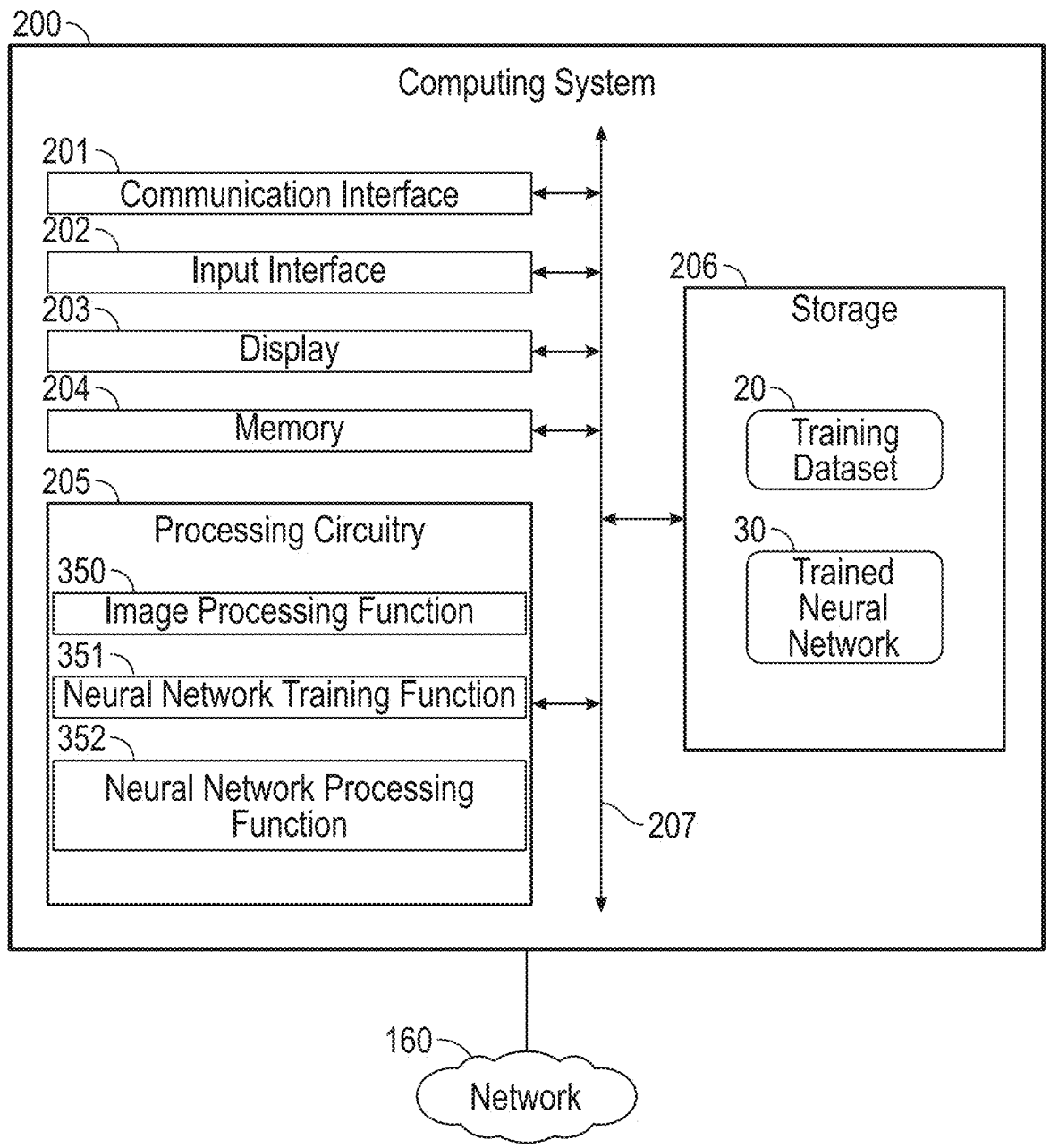
FIG. 3 illustrates an example embodiment of a computing system for training a neural network and for applying a trained neural network.

According to some embodiments, the computing system 200 includes hardware, software or both for performing functions identified in FIG. 3. For example, as illustrated in FIG. 3, the computing system 200 may additionally include functionality such as an image processing function 350, neural network training function 351, or neural network processing function 352. The processing circuitry 205 may, for example, implement the image processing function 350 to cause the computing system 200 to perform one or more steps described herein to perform image processing on image data, such as X-ray image data, and to output information to the display 203, or to another apparatus such as the medical imaging apparatus 110. In some embodiments, the processing circuitry 205 implements the neural network training function 351 to cause the computing system 200 to perform one or more steps described with reference to FIG. 15. In some embodiments, the processing circuitry 205 implements the neural network processing function 352 to cause the computing system 200 to perform one or more steps described with reference to FIG. 19.

Figure 4:
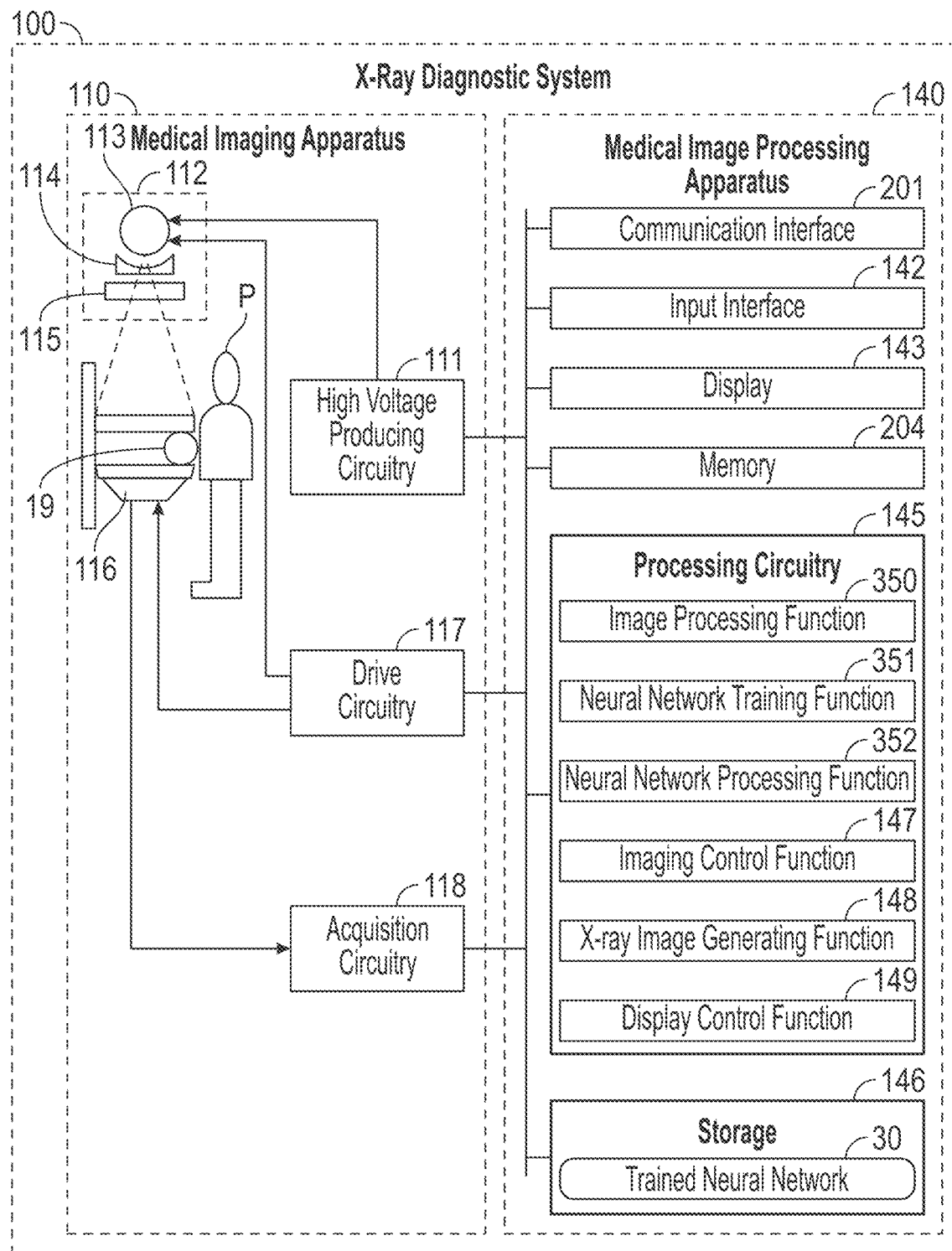
FIG. 4 illustrates an example embodiment of an X-ray diagnostic system including a medical imaging apparatus and a medical image processing apparatus.

According to some embodiments, the computing system 200 is a computer included on the X-ray diagnostic system 100 of FIG. 4. For example, the medical image processing apparatus 140 of FIG. 4 may include one or more processing functions described with reference to the computing system 200. According to various embodiments, all or a portion of the description of the computing system 200 is applicable to all or a portion of the medical image processing apparatus 140. In some embodiments, the computing system 200 is applicable to all or a portion of the medical imaging apparatus 110, or remote computing system configured to perform one or more steps or functions described herein. In some embodiments, the computing system 200 comprises the medical image processing apparatus 140. In some embodiments, the computing system 200 provides functionality described with reference to the medical image processing apparatus 140. In some embodiments, software running on the computing system 200 performs one or more operations described herein.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 200 performs one or more steps of one or more methods described or illustrated herein. In some embodiments, the computing system 200 provides functionality described or illustrated herein. In some embodiments, software running on the computing system 200 performs one or more steps of one or more methods described or illustrated herein or provides functionality described or illustrated herein. Some embodiments include one or more portions of the computing system 200.

The communication interface 201 includes hardware, software, or both providing one or more interfaces for communication (such as, for example, packet-based communication) between the computing system 200 and one or more other computing systems or one or more networks. For example, the communication interface 201 enables the computing system 200 to communicate with the medical imaging apparatus 110 and other network entities such as, for example, the camera 150, or other electronic device or computing apparatus such as a network server or cloud server. As an example and not by way of limitation, the communication interface 201 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 201 for it. As an example and not by way of limitation, the computing system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 200 may communicate with a wireless PAN (WPAN) (such as, for example, a Bluetooth WPAN or an ultra-wideband (UWB) network), a WI-FI network, a WI-MAX network, a cellular telephone network (such as, for example, a Global System for Mobile Communications (GSM) network), or other suitable wireless network or a combination of two or more of these. The computing system 200 may include any suitable communication interface 201 for any of these networks, where appropriate. The communication interface 201 may include one or more communication interfaces 201.

The input interface 202 includes hardware, software, or both providing one or more interfaces for communication between the computing system 200 and one or more input devices. The computing system 200 may include one or more of these input devices, where appropriate. One or more of these input devices may enable communication between a person and the computing system 200. As an example and not by way of limitation, an input device may include a light source, a keyboard, keypad, microphone, monitor, mouse, speaker, still camera, stylus, tablet, touch screen, trackball, video camera, another suitable I/O device or a combination of two or more of these. An input device may include one or more sensors. In some embodiments, the input interface 202 includes one or more device or software drivers enabling the processing circuitry 205 to drive one or more of these input devices. The input interface 202 may include one or more input interfaces.

The display 203 displays various types of information according to the processing circuitry 205. For example, the display 203 may display a medical image, a target output image, and a medical image subjected to the image processing. The display 203 outputs a graphical user interface (GUI) or the like for receiving various operations from the user. For example, as the display 203, a liquid crystal display (LCD), a cathode ray tube (CRT) display, an organic electroluminescence display (OELD), a plasma display, or any other display may be suitably adopted.

In some embodiments, the memory 204 includes main memory for storing instructions for the processing circuitry 205 to execute or data for the processing circuitry 205 to operate on. By way of example, the computing system 200 may load instructions from the storage 206 or another source to the memory 204. During or after execution of the instructions, the processing circuitry 205 may write one or more results (which may be intermediate or final results) to the memory 204. One or more memory buses (which may each include an address bus and a data bus) may couple the processing circuitry 205 to the memory 204. One or more memory management units (MMUs) may reside between the processing circuitry 205 and the memory 204 and facilitate accesses to the memory 204 requested by the processing circuitry 205. The memory 204 may include one or more memories. The memory 204 may be random access memory (RAM).

The storage 206 stores data and/or instructions. As an example and not by way of limitation, the storage 206 may include a hard disk drive, a floppy disk drive, flash memory, an optical disc, a magneto-optical disc, magnetic tape, or a Universal Serial Bus (USB) drive or a combination of two or more of these. In some embodiments, the storage 206 is a removable medium. In some embodiments, the storage 206 is a fixed medium. In some embodiments, the storage 206 is internal to the computing system 200. In some embodiments, the storage 206 is external to the computing system 200. In some embodiments, the storage 206 is non-volatile, solid-state memory. In some embodiments, the storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 206 may include one or more memory devices. One or more program modules stored in the storage 206 may be configured to cause various operations and processes described herein to be executed. The storage 206 may store application data, program modules and other information. In some embodiments, application(s) reside on the storage 206 and execute on the computing system 200. One or more program modules stored in the storage 206 are configured to cause various operations and processes described herein to be executed when instructions, executed by one or more processors, cause the one or more processors to perform one or more operations described with respect to one or more of FIGS. 6-19.

The bus 207 interconnects various components of the computing system 200 thereby enabling the transmission of data and execution of various processes. The bus 207 may include one or more types of bus structures including a memory bus or memory controller, a peripheral bus, and a local bus using any of a variety of bus architectures.

The medical imaging apparatus 110 performs medical imaging on a subject. In some embodiments, the medical imaging apparatus 110 is an X-ray imaging apparatus. In some embodiments, the medical imaging apparatus 110 is a mammography system, such as the medical imaging apparatus 110 illustrated in FIG. 4. In some embodiments, the medical imaging apparatus 110 emits X-rays from a radiation device to a breast of a subject sandwiched and expanded between a pressure plate and an imaging stand. For example, as illustrated in FIG. 4, a detector installed on the backside of the imaging stand may output a detection signal in response to incidence of the X-rays. In general, in the examination using mammography, each breast on the right and the left is pushed on the imaging stand into a predetermined thickness, and then, for example, two images for each of the right and left breasts with different imaging directions, in total, four images are taken. In such a configuration, the medical imaging apparatus 110 performs an imaging control process, so that target substances can be estimated. In some embodiments, the raw data obtained by the medical imaging apparatus 110 is X-ray image data.

In some embodiments, the medical imaging apparatus 110 may include other imaging modalities. For example, the medical imaging apparatus 110 may include one or more of a magnetic resonance imaging apparatus, X-ray computed tomography imaging apparatus, PET apparatus, SPECT apparatus, or ultrasonic diagnostic apparatus.

The camera 150 may include one or more processors, one or more memories, and one or more storage devices. In some embodiments, the camera 150 includes one or more lenses. The camera 150 may be in communication with one or more storage devices for storing the photographic image data 15. In some embodiments, the camera 150 includes one or more image sensors such as a CCD (charge coupled device) or CMOS (complementary metal oxide semiconductor) image sensor. The camera 150 may include image processing circuitry for processing an acquired image. In some embodiments, the camera 150 includes hardware, software, or both for providing functionality for capturing image data by receiving light of a focused object image and converting it into an analogue signal. An analog/digital (A/D) converter may convert the image signal in the form of an analog signal output from an image pickup element into a digital signal. In some embodiments, the camera 150 acquires digital still images such as digital photographs. In some embodiments, the camera 150 acquires digital moving images such as digital movies. In some embodiments, one or more frames of a digital movie may be stored as one or more respective digital photographs included in the photographic image data 15.

The network 160 couples one or more servers and one or more clients to each other. The network 160 may be any suitable network. For example, one or more portions of the network 160 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 160 may include one or more networks.

FIG. 4 illustrates an example embodiment of an X-ray diagnostic system 100. In some embodiments, the X-ray diagnostic system 100 is an X-ray mammography system. The X-ray diagnostic system 100 includes the medical imaging apparatus 110 and the medical image processing apparatus 140.

The medical imaging apparatus 110 is a device that emits X-rays to a subject P and counts photons of X-rays transmitted through the subject P. The medical imaging apparatus 110 includes high voltage producing circuitry 111, a radiation device 112, a detector 116, drive circuitry 117, and acquisition circuitry 118. The high voltage producing circuitry 111 supplies high voltage for allowing an X-ray tube 113 to produce X-rays. The high voltage producing circuitry 111 adjusts the amount of X-rays (X-ray dose) emitted to the subject P by adjusting tube voltage and tube current supplied to the X-ray tube 113.

The radiation device 112 includes the X-ray tube 113, a radiation quality filter 114, and an X-ray beam limiting device 115. The X-ray tube 113 produces X-rays to be emitted to the subject P with a high voltage supplied from the high voltage producing circuitry 111. For example, the X-ray tube 113 is a vacuum tube emitting X-rays. The radiation quality filter 114 is an X-ray filter for adjusting the X-ray dose of X-rays emitted from the X-ray tube 113. For example, the radiation quality filter 114 is a filter that transmits and attenuates X-rays radiated from the X-ray tube 113 such that the X-rays emitted from the X-ray tube 113 to the subject P have a predetermined distribution. The radiation quality filter 114 may be called a wedge filter or a bow-tie filter. The X-ray beam limiting device 115 is a slit for limiting the radiation range of X-rays with an X-ray dose adjusted by the radiation quality filter 114. For example, the X-ray beam limiting device 115 has four slidable blades, and these blades are slid to limit the X-rays produced by the X-ray tube 113 and apply the limited X-rays to the subject P. It is noted that the radiation range includes a region of interest (ROI).

The drive circuitry 117 moves the positions of the radiation device 112 and the detector 116, based on a control signal from the imaging control function 147. The drive circuitry 117 also moves the radiation quality filter 114 to the front of the X-ray tube 113 or moves the radiation quality filter 114 from the front of the X-ray tube 113, based on a control signal from the imaging control function 147. The drive circuitry 117 also controls the X-ray beam limiting device 115 to change a size of the radiation range of X-rays emitted to the subject P or move the position of the radiation range, based on a control signal from the imaging control function 147.

The detector 116 outputs a detection signal in response to incidence of X-rays emitted from the radiation device 112. The X-rays are, for example, X-rays transmitted through the subject P. The detector 116 has a plurality of detection elements for counting photons of X-rays (X-ray photons) transmitted through the subject P. The detector 116 is, for example, an X-ray flat panel detector including a plurality of detection elements regularly arranged in a predetermined direction and a direction crossing the predetermined direction. The detection elements each have a scintillator, a photodiode, and detection circuitry. The detection elements each convert photons of incident X-rays into light one by one with the scintillator and convert the light into electrical charge with the photodiode. The electric charge is converted by the detection circuitry into pulsed current. The detector 116, for example, outputs the pulsed current in the form of analog waveform data to the acquisition circuitry 118 or converts the pulsed current into digital waveform data to output the converted waveform data to the acquisition circuitry 118. Such waveform data is, for example, data of a waveform indicating a current value at each time, in which the time is represented by the horizontal axis and the current value is represented by the vertical axis. The detector 116 including a detection element having a scintillator and a photodiode as described above is called indirect conversion detector.

The detector 116 may be a direct conversion detector. The direct conversion detector is a detector that converts photons of X-rays incident on a detection element directly into electrical charge. When the detector 116 is a direct conversion detector, the detection element is, for example, a cadmium telluride (CdTe)-based semiconductor device. In addition, when the detector 116 is a direct conversion detector, the detector 116 converts electrical charge into pulsed current with the detection circuitry to output the pulsed current in the form of analog waveform data to the acquisition circuitry 118 or converts the pulsed current into digital waveform data to output the converted waveform data to the acquisition circuitry 118.

The detector 116 may be a detector having detection elements arranged in a row or a detector having detection elements arranged in a plurality of rows. In this case, in the X-ray diagnostic system 100, a roentgenogram is taken while the drive circuitry 117 is moving the position of the detector 116 continuously or stepwise. It is noted that the aforementioned waveform data is an example of the detection signal.

The acquisition circuitry 118 and X-ray image generating function 148 may be incorporated into the detector 116. In this case, the detector 116 has, in addition to the function of the detector 116 described above, the functions of the acquisition circuitry 118 and the X-ray image generating function 148. In this case, the detector 116, the acquisition circuitry 118, and the X-ray image generating function 148 are integrated together.

The medical image processing apparatus 140 is a device that accepts an operation by the operator and also generates an X-ray image using the photon count data created by the medical imaging apparatus 110. The medical image processing apparatus 140 has an input interface 142, a display 143, processing circuitry 145, and storage 146.

The processing circuitry 145 is an example of the processing circuitry 205 of the computing system 200 and controls the operations of the X-ray diagnostic system 100. The processing circuitry 145 performs, for example, the imaging control function 147, the X-ray image generating function 148, and a display control function 149. The display control function 149 controls the display of images on the display 143. The formatting of the display may be based on input operations that are received from the operator via the input interface 142.

The input interface 142 is an example of the input interface 202 of the computing system 200 and is implemented by, for example, a keyboard, a trackball, a switch, a button, a joystick, or the like. The input interface 142 accepts a variety of instructions and settings from the operator of the X-ray diagnostic system 100 and transfers information of the instruction or the setting accepted from the operator to the processing circuitry 145.

For example, the input interface 142 accepts a setting condition described later and an X-ray radiation condition described later as well as an image processing condition for an X-ray image and transfers the accepted setting condition and X-ray radiation condition and image processing condition to the processing circuitry 145.

The display 143 is an example of the display 203 of the computing system 200 and is implemented by, for example, a liquid crystal monitor, a cathode ray tube (CRT) monitor, or the like, which is referred to by the operator. The display 143 is connected to the processing circuitry 145 and displays various types of information according to the display control function 149 of the processing circuitry 145. Data of a variety of information and images sent from the processing circuitry 145 are converted into an electrical signal and output on the display 143. For example, in some embodiments, the display 143 displays a roentgenogram to the operator. In some embodiments, the display 143 displays a graphical user interface (GUI) for accepting a variety of instructions, settings, and the like from the operator through the input interface 142, under the control by the processing circuitry 145. It is noted that the roentgenogram is an example of the X-ray image.

The imaging control function 147 is implemented by, for example, one or more processors. The imaging control function 147 controls the operation of the high voltage producing circuitry 111, the drive circuitry 117, and the acquisition circuitry 118 under the control of the processing circuitry 145 to control creation of photon count data in the medical imaging apparatus 110. For example, the imaging control function 147 controls the drive circuitry 117 to move the radiation device 112 and the detector 116 to a position suitable for taking a roentgenogram and controls the high voltage producing circuitry 111 to emit X-rays to the subject P. The imaging control function 147 also controls the acquisition circuitry 118 to create a variety of photon count data.

The X-ray image generating function 148 is implemented by, for example, one or more processors. The X-ray image generating function 148 obtains photon count data output from the acquisition circuitry 118 and then generates a roentgenogram based on the obtained photon count data. The roentgenogram is used, for example, for diagnosis by a radiographer. For example, the X-ray image generating function 148 generates a roentgenogram by performing a material decomposition process on photon count data. Such a roentgenogram is an image in which a target substance is identified.

As used herein, the "material decomposition process" is a process of identifying the kinds, atomic numbers, densities, and the like of substances included in the region in which a roentgenogram is taken, based on photon count data. The kinds, atomic numbers, densities, and the like of substances identified through such a material decomposition process are useful information for a radiographer to make a diagnosis.

As for algorithms of the material decomposition process performed by the X-ray image generating function 148, various known algorithms for material decomposition can be applied. For example, when photon count data created using N energy bins is used, such an algorithm for the material decomposition process can generate a roentgenogram in which N target substances as many as the number of energy bins are identified.

The X-ray image generating function 148 then outputs the generated roentgenogram to the storage 146.

The storage 146 is an example of the storage 206 of the computing system 200 and is implemented by, for example, a semiconductor memory device such as a random access memory (RAM) and a flash memory, a hard disk, an optical disk, or the like. The storage 146 stores the roentgenogram output from the X-ray image generating function 148.

The processing circuitry 145 is implemented by, for example, one or more processors. The processing circuitry 145 controls the photon-counting X-ray diagnostic system 100 by controlling the operation of the medical imaging apparatus 110 and the medical image processing apparatus 140. For example, the processing circuitry 145 controls creation of photon count data in the medical imaging apparatus 110 by controlling the imaging control function 147 and controls generation and display of a roentgenogram by controlling the medical image processing apparatus 140.

According to some embodiments, the term processor as used in the description means, for example, a central processing unit (CPU), a graphics processing unit (GPU), or circuitry such as an application specific integrated circuit (ASIC) or a programmable logic device (for example, a simple programmable logic device (SPLD), a complex programmable logic device (CPLD), and a field programmable gate array (FPGA)). In place of storing a program in an internal storage circuitry, a program may be directly built in a circuitry in the processor. In this case, the processor reads out and executes the program built in the circuitry to implement the functions.

The imaging control function 147 controls creation of photon count data in the medical imaging apparatus 110 by controlling the operation of the acquisition circuitry 118. In some embodiments, the input interface 142 accepts a setting condition and an X-ray radiation condition from the user and the imaging control function 147 receives the accepted setting condition and X-ray radiation condition. According to some embodiments, the setting condition is, for example, a condition concerning setting of a plurality of energy bins used when the acquisition circuitry 118 creates photon count data. In some embodiments, the X-ray radiation condition is, for example, a condition concerning X-rays emitted by the radiation device 112. The accepted setting condition is a condition initially (at the start of control) used in controlling the acquisition circuitry 118 in each of preliminary imaging and main imaging.

The accepted X-ray radiation condition is a condition initially (at the start of control) used in controlling the high voltage producing circuitry 111 and the drive circuitry 117 in each of preliminary imaging and main imaging. The accepted setting condition and X-ray radiation condition therefore may be referred to as initial setting condition and X-ray radiation condition in each of preliminary imaging and main imaging.

According to some embodiments, the medical imaging apparatus 110 of FIG. 4 is a mammography system. As illustrated in FIG. 4, X-rays are emitted from the radiation device 112 to a breast 19 of the subject P sandwiched and expanded between the pressure plate and the imaging stand. In the mammography system illustrated in FIG. 4, the detector 116 installed on the backside of the imaging stand outputs a detection signal in response to incidence of the X-rays. In general, in the examination using mammography, each breast 19 on the right and the left is pushed on the imaging stand into a predetermined thickness, and then, for example, two images for each of the right and left breasts with different imaging directions, in total, four images are taken. In such a configuration, the mammography system illustrated in FIG. 4 performs an imaging control process described above and modifications, so that many target substances can be estimated with high precision, and the exposure dose can be reduced. Using the medical imaging apparatus 110 of FIG. 4, X-ray images may be obtained and stored in the medical image processing apparatus 140.

Figure 5B:
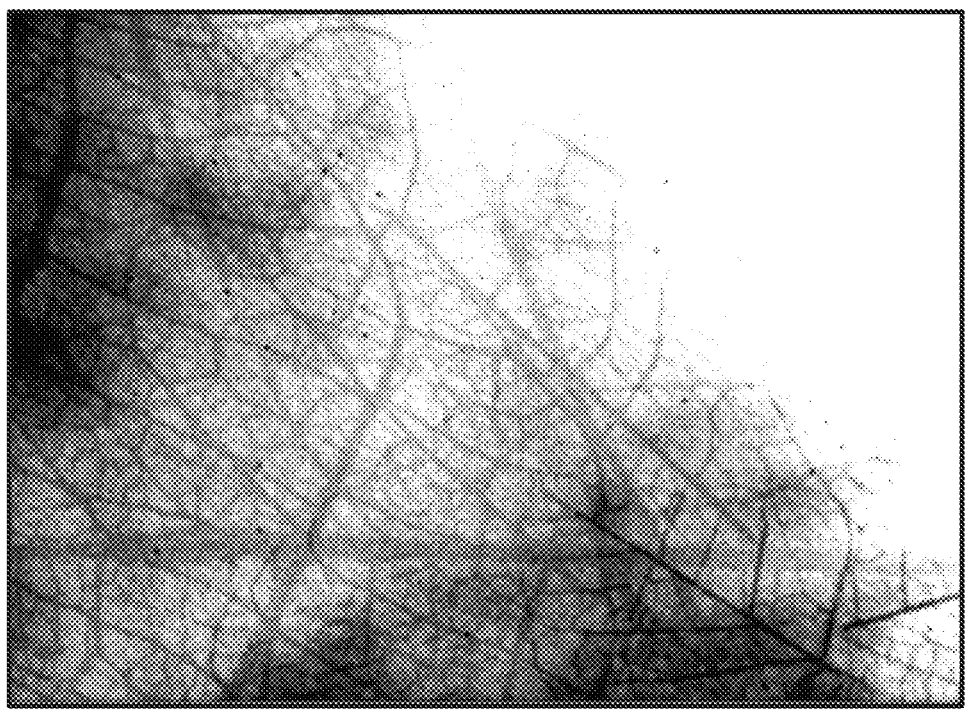
FIG. 5B illustrates example target data for training the neural network.
Figure 5A:
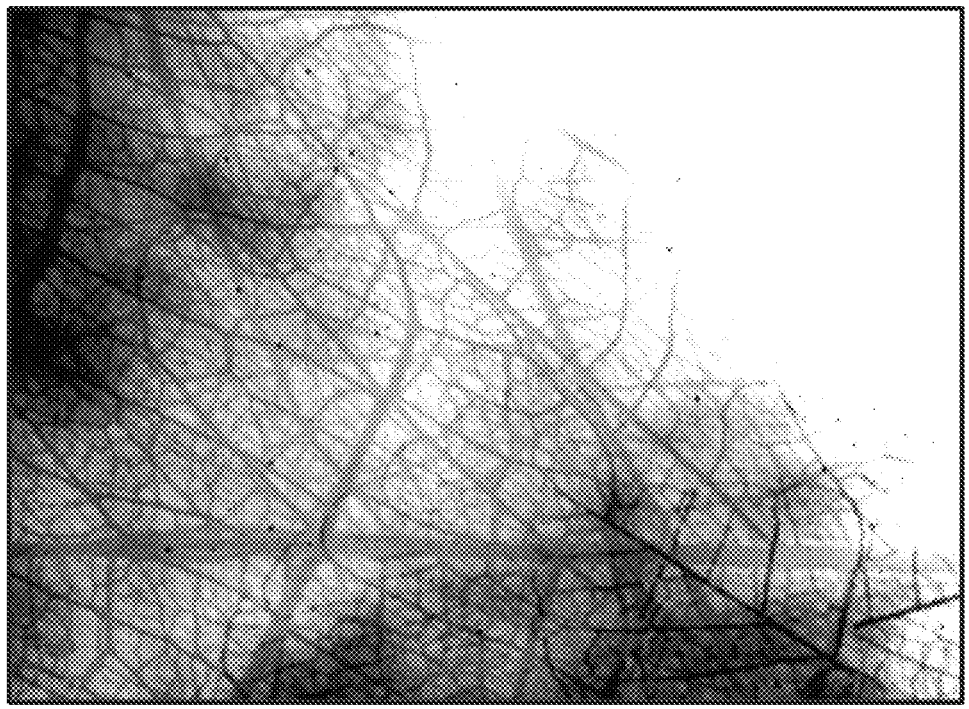
FIG. 5A illustrates example training data used as input for training a neural network.

FIG. 5A illustrates example training data used as an input for training a neural network and FIG. 5B illustrates example target data for training the neural network. FIG. 5A depicts an example of training data 21 and FIG. 5B depicts an example of target data 22 included in the training dataset 20 generated in the example of FIG. 1.

According to some embodiments, the training data of FIGS. 5A and 5B is provided to a neural network implementing a deep learning method, such as a U-Net neural network. According to some embodiments, the trained neural network is used for removing noise from mammographic images by applying the neural network using an X-ray image as an input and outputting data to generate a corrected image corresponding to the input X-ray image but in which noise has been reduced.

To generate the image in FIG. 5B, high resolution and noise clean training data is obtained from a combination of real clinical data and high resolution noise free photographs. The real clinical data is used as a background, where the general shape of the breast and the long wavelength component inside the breast region are maintained. For photographs, pictures including textural features that simulate detailed structure on mammographic images are used. By way of example, aspects from leaves and furs are used in some embodiments. Additional examples of photographic images include cloud pictures, sky picture, picture of sea, textural features of leaves, textural images of fur, picture of trees, picture illustrating textural features of a wall. Images of any suitable subject matter may be used which includes one or more features characteristic of mammographic X-ray images. For example, pictures which have similar features to blood tubes and glandular found in the breast. The above-described components of X-ray images and photographic images are imprinted together to represent the no-noise mammographic ground truth. For example, FIG. 5B depicts a combined image generated based on the above-described criteria.

FIG. 5A is generated by adding noise to the image of FIG. 5B. For example, synthetic noisy input data is created (e.g., shown in FIG. 5A) by applying the system noise model onto the ground truth of FIG. 5B.

Figure 6:
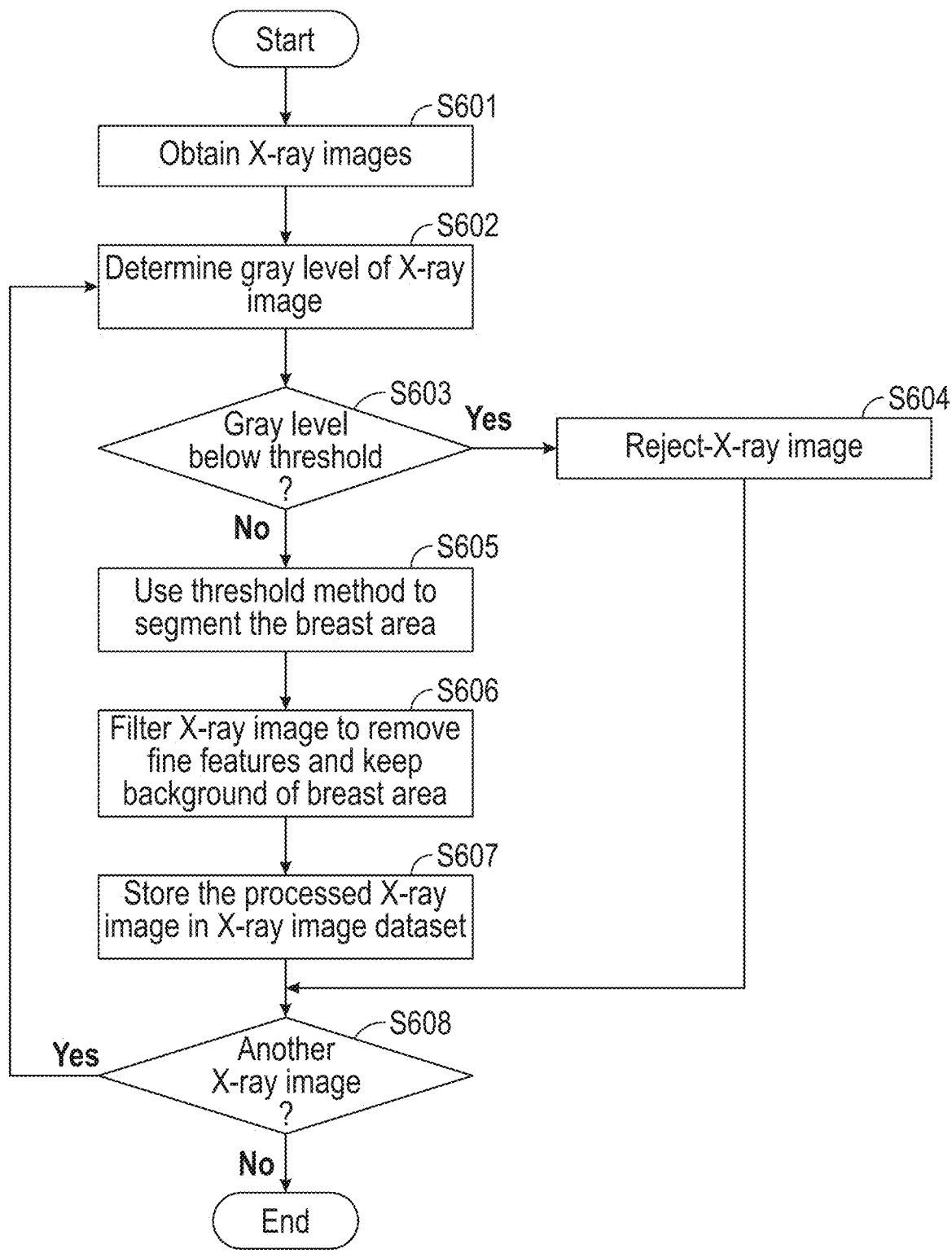
FIG. 6 illustrates an example operational flow for obtaining X-ray image data for use in generating training data.

FIG. 6 illustrates an example operational flow for use in obtaining an X-ray image dataset. In some embodiments, one or more of the steps of FIG. 6 are performed using X-ray images acquired at the medical imaging apparatus 110.

In step S601, X-ray images are obtained. For example, in some embodiments, the computing system 200 obtains X-ray images acquired by the medical imaging apparatus 110. The X-ray images may be stored in the storage 206. In some embodiments, the X-ray images are stored in the storage 146 when the medical image processing apparatus 140 receives the X-ray images from the medical imaging apparatus 110. According to some embodiments, the X-ray images are obtained by the computing system 200 from one or more network storage devices. For example, X-ray images previously obtained may be stored on a network storage device accessible via a network (such as a local area network and/or via the Internet).

In step S602, the computing system 200 determines a gray level of an X-ray image obtained in the S601. Then, in step S603, the computing system 200 determines whether the gray level of the X-ray image is below a predetermined threshold. If the gray level of the X-ray image is below the predetermined threshold (Yes in step S603), the flow proceeds to step S604. In step S604, the computing system rejects the X-ray image for which the gray level is determined to be below the predetermined threshold. For example, the X-ray image for which the gray level is below the predetermined threshold is deleted from the storage 206. On the other hand, if the gray level of the X-ray image is not below the predetermined threshold (No in step S603), the flow proceeds to step S605.

In step S605, the computing system 200 uses a threshold method to segment the breast area in the X-ray image. Various techniques and technologies can be used to perform the segmentation. In some embodiments, a grayscale pixel threshold method is applied in which pixels that have gray values below a predefined threshold are determined to be breast area. Any suitable grayscale threshold method for segmenting the breast area may be used. Moreover, other threshold methods may be applied using one or a combination of segmentation techniques, such as simple Hounsfield Units (HU) thresholds, an automatic threshold method such as the Otsu automatic threshold method, or k-means method may be used to segment the X-ray image. Then, in step S606, the X-ray image is filtered to remove fine features and only keep the background of the breast area. In some embodiments, a Gaussian filter is used. For example, the Gaussian filter may be applied to maintain the long wavelength component inside the breast region. Any suitable filter may be used to remove fine features from the X-ray image and keep the background of the breast, such that the general shape of the breast is maintained, along with the long wavelength component inside the breast region. Any suitable method may be used for performing the segmenting and filtering of the X-ray image.

Then, in step S607, the X-ray image which has been segmented and filtered is stored as an X-ray image in an X-ray image dataset. For example, the X-ray image may be stored in the storage 206 of the computing system 200 as part of the X-ray image dataset. Then the flow proceeds to step S608.

In step S608, the computing system 200 determines whether another X-ray image is present among the X-ray images obtained in step S601. If another X-ray image is present (Yes in step S608), the flow proceeds to step S602. For example, the gray level is determined for the next X-ray image among the X-ray images obtained in step S601 and the process of FIG. 6 is repeated for the next X-ray image. On the other hand, if the computing system 200 determines that no other X-ray image remains (No in step S608), the flow ends. Thus, by virtue of performing the processing of steps S601 to S608 multiple X-ray images will be included in the X-ray image dataset, and each X-ray image in the dataset will have been segmented and filtered to remove fine features and only keep the background of the breast area in each of the respective X-ray images in the X-ray image dataset. By way of example, in some embodiments, at least 1000 X-ray images are included in the X-ray image dataset. Furthermore, all of the X-ray images may be obtained from the medical imaging apparatus 110 and have the same type of noise. The image size of the X-ray images included in the X-ray image dataset may be fixed, for example 2016×2816. Alternatively, the dataset may be, for example, 1K×1K images. In some embodiments, the dataset may be 512×512.

Figure 7:
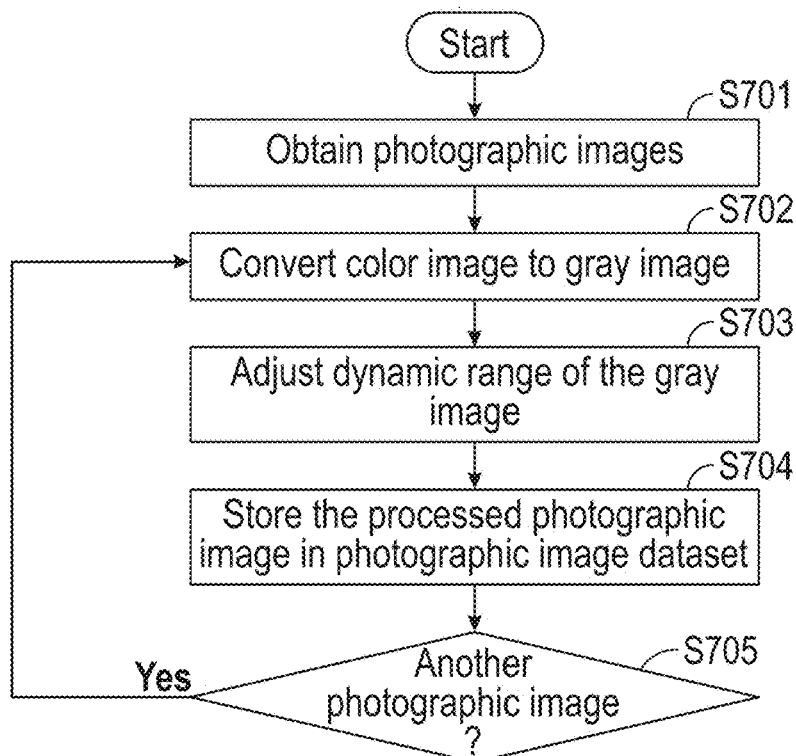
FIG. 7 illustrates an example operational flow for obtaining photographic image data for use in generating training data.

FIG. 7 illustrates an example operational flow for use in obtaining a non-X-ray image dataset. The non-X-ray image dataset may be, for example, a photographic image dataset. In some embodiments, one or more of the steps of FIG. 7 are performed at the computing system 200 by executing program instructions of one or more application(s) on the computing system 200. In some embodiments, image data captured by the camera 150 are stored in one or more servers. For example, image data may be stored in a database on the one or more servers.

In step S701, photographic images are obtained. For example, in some embodiments, the computing system 200 obtains photographic images acquired by the camera 150. In some embodiments, the photographic images are stored in one or more servers connected to a network. For example, in some embodiments, the photographic images are obtained by the camera 150 and stored in one or more network storage devices, such as a network storage device or one or more servers accessible via a network (such as a local area network and/or via the Internet). According to some embodiments, the photographic images have a resolution higher than that of the X-ray images in the X-ray image dataset obtained by the process of FIG. 6. Moreover, the photographic images may have features similar to a component of breast tissue, such as, vessels and glandular, for example. Moreover, the photographic images have less noise than X-ray images in the X-ray image dataset obtained by the process of FIG. 6. According to some embodiments, the photographic images may include one or more of, for example, images of leaves or other suitable image which include characteristics such as vessels or glandular regions. Further by way of example, the photographic images may include one or more images of fur, images of trees, images of clouds, images of sky, images of a wall's texture, or other suitable image which include characteristics of a texture similar to that of the breast tissue.

In step S702, a photographic image from among the photographic images obtained in step S701 is converted from color to a gray image. Then, in step S703, a dynamic range of the gray image is adjusted based on a dynamic range of the X-ray image dataset. For example, the dynamic range of the X-ray image generated in step S702 is adjusted to correspond to X-ray images in the X-ray image dataset. Then, in step S704, the photographic image having been converted to the gray image and having its dynamic range adjusted is stored as a photographic image in a photographic image dataset. For example, the photographic image dataset may be stored in the storage 206 of the computing system 200. Then the flow proceeds to step S705.

In step S705, the computing system 200 determines whether another photographic image is present among the photographic images obtained in step S701. If another photographic image is present (Yes in step S705), the flow proceeds to step S702. For example, the next photographic image among the photographic images obtained in step S701 is converted from color to a gray image and the process of FIG. 7 is repeated for the next photographic image. On the other hand, if the computing system 200 determines that no other photographic image remains (No in step S705), the flow ends. Thus, by virtue of performing the processing of steps S701 to S705 multiple photographic images will be included in the photographic image dataset.

Figure 8:
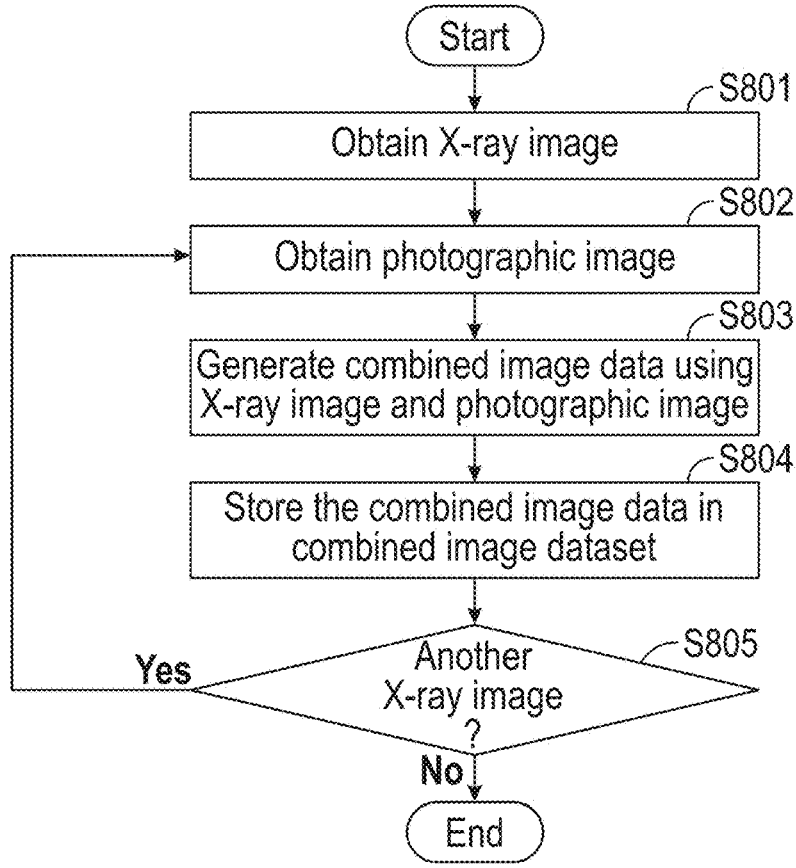
FIG. 8 illustrates an example operational flow for generating training data using X-ray image data and photographic image data.

FIG. 8 illustrates an example operational flow for use in generating combined image data using the X-ray image dataset and the photographic image dataset. In some embodiments, one or more of the steps of FIG. 8 are performed at the computing system 200 by executing program instructions of one or more application(s) on the computing system 200. In some embodiments, the combined image data generated in FIG. 8 are stored in the storage 206. In some embodiments, the combined image data generated in FIG. 8 are stored on one or more network storage devices accessible via a network (such as a local area network and/or via the Internet).

In step S801, the computing system 200 obtains an X-ray image from the X-ray image dataset generated by the process of FIG. 6. In step S802, the computing system 200 obtains a photographic image from the photographic image dataset generated by the process of FIG. 7.

In step S803, the computing system 200 generates combined image data by combining the X-ray image and the photographic image. According to some embodiments, in generating the combined image data, a contour line of the breast and a background component of the X-ray image are combined with a texture in the photographic image. In step S804, the combined image data is stored in a combined image dataset. For example, the combined image dataset may be stored in the storage 206 of the computing system 200. Then the flow proceeds to step S805.

In step S805, the computing system 200 determines whether another X-ray image is present among the X-ray image dataset generated by the process of FIG. 6. If another X-ray image is present (Yes in step S805), the flow proceeds to step S802 and the process of FIG. 8 is repeated. For example, the computing system 200 obtains another photographic image from the photographic image dataset. Then, in step S803, the computing system combines the next X-ray image with the photographic image. On the other hand, if the computing system 200 determines in step S805 that no other X-ray image remains (No in step S805), the flow ends. Thus, by virtue of performing the processing of steps S801 to S805 multiple combined photographic images are stored as the combined image dataset.

Figure 10:
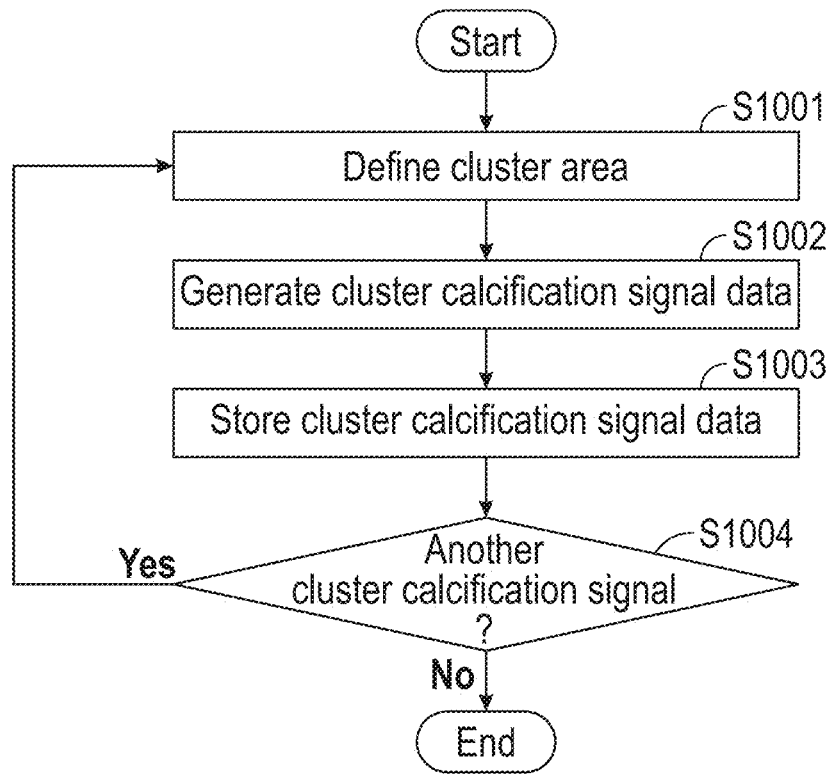
FIG. 10 illustrates an example operational flow for generating cluster image data for simulating cluster calcifications in the training data.
Figure 11:
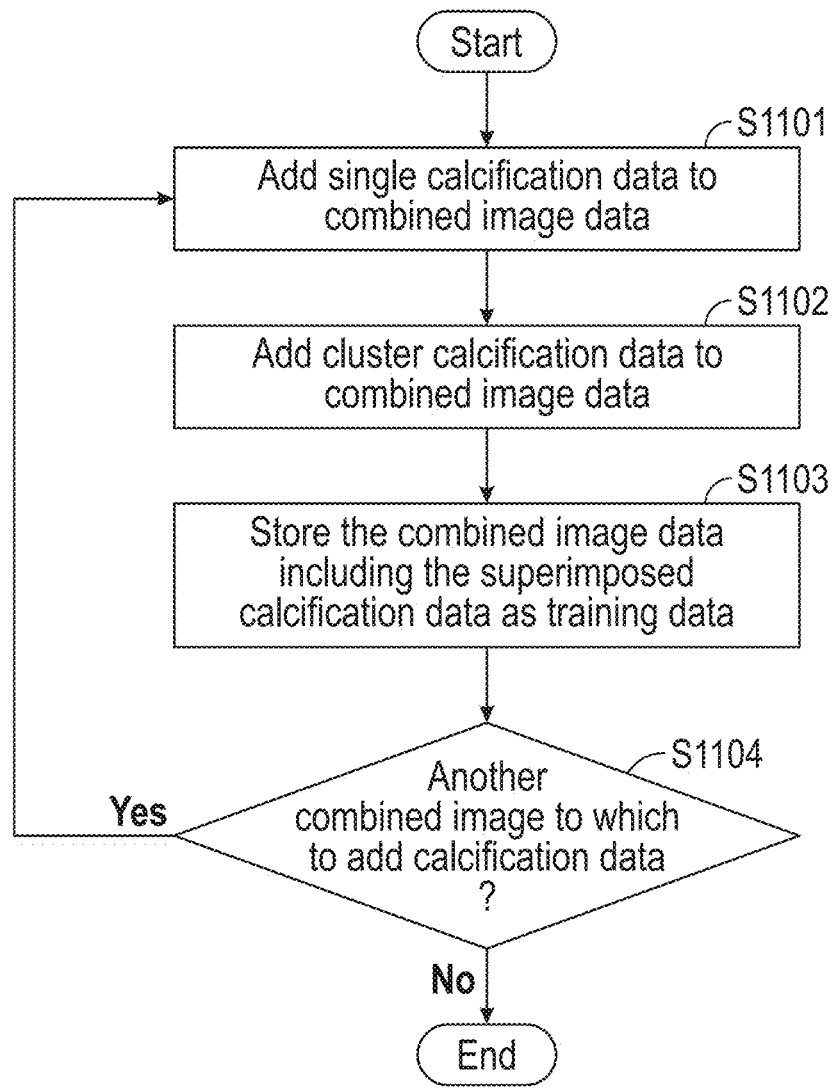
FIG. 11 illustrates an example operational flow for generating training data by superimposing the image data simulating single calcifications and the cluster image data simulating cluster calcifications onto image data.

Calcification is an important feature on mammographic images and a critical indicator for some breast disease such as breast cancer. Thus, it is important to preserve and enhance the calcification features during the denoising process. Accordingly, FIGS. 9-11 provide example embodiments for adding calcification signals to the combined image dataset generated in FIG. 8.

Figure 9:
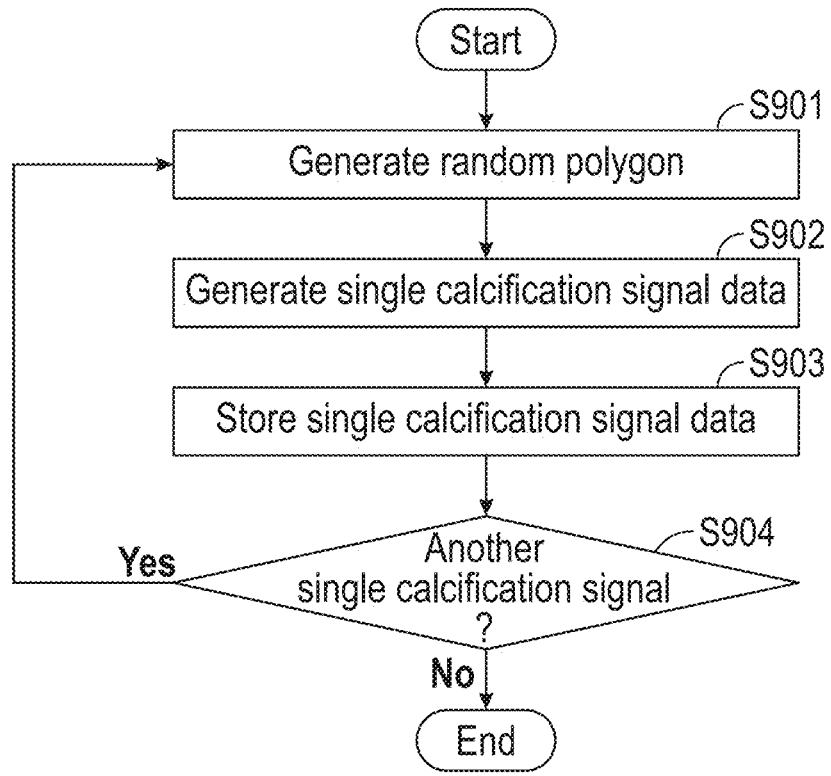
FIG. 9 illustrates an example operational flow for generating image data for simulating calcifications in the training data.

FIG. 9 illustrates an example operational flow for use in generating calcification signals to add to images to generate an initial training dataset. In some embodiments, one or more of the steps of FIG. 9 are performed at the computing system 200 by executing program instructions of one or more application(s) on the computing system 200. In some embodiments, the calcification signals generated in FIG. 9 are stored in the storage 206. In some embodiments, the calcification signals generated in FIG. 9 are stored on one or more network storage devices accessible via a network (such as a local area network and/or via the Internet).

In step S901, the computing system 200 generates a random polygon used for simulating a single calcification signal. For example, in step S901, the computing system 200 may randomly generate a number of vertices of the polygon within a range. The computing system may randomly generate, for example, three to 10 vertices to be used for generating the polygon. Additionally, the computing system 200 may randomly generate a number within a range, for example 10 to 20, to determine the area of the polygon. Then, within the area of the randomly generated polygon, the computing system 200 may generate coordinates of the vertices to determine the shape of the polygon.

In step S902, the computing system 200 generates data of a single calcification signal based on the randomly generated polygon. For example, after the random polygon is generated, a random coordinate within the size of the image, 2016×2018 for example, is generated to determine the position of the polygon. The gray level of the pixels within the polygon will be reduced by a predetermined amount, for example 10%, to simulate the calcification signal.

In step S903, the single calcification signal data generated in step S902 is stored. For example, in some embodiments, the single calcification signal is stored in the storage 206. In some embodiments, the single calcification signal is stored in a network storage device accessible via a network (such as a local area network and/or via the Internet). Then the flow proceeds to step S904.

In step S904 the computing system 200 determines whether to generate another calcification signal. If another calcification signal is to be generated (Yes in step S904), the flow proceeds to step S901 and the process of FIG. 9 is repeated. For example, the computing system 200 generates another calcification signal in step S901 and S902 and stores the calcification signal in step S903. On the other hand, if the computing system 200 determines in step S904 that no other calcification signal is to be created (No in step S904), the flow ends. Thus, by virtue of performing the processing of FIG. 9 multiple calcification signals are generated and stored.

FIG. 10 illustrates an example operational flow for use in generating cluster calcification signals to add to images to generate an initial training dataset. In some embodiments, one or more of the steps of FIG. 10 are performed at the computing system 200 by executing program instructions of one or more application(s) on the computing system 200. In some embodiments, the cluster calcification signals generated in FIG. 10 are stored in the storage 206. In some embodiments, the cluster calcification signals generated in FIG. 10 are stored on one or more network storage devices accessible via a network (such as a local area network and/or via the Internet).

In step S1001, the computing system 200 randomly defines the area of a cluster by randomly determining a radius of a circle, within a range, for example 50 pixels to 300 pixels. In some embodiments, the computing system 200 generates random noise in the area and sets negative values to zero. Furthermore, according to some embodiments, the computing system generates a two-dimensional spatial filter and applies it to the cluster area to make the area fade from the center to the edge. For example, the spatial filter used in creating the cluster calcification signal may be, for example, a Gaussian filter, a linear spatial filter, a sigmoid function filter, or other suitable filter.

In step S1002, the computing system 200 generates a cluster calcification signal based on the randomly generated cluster area. For example, after the cluster is generated, a random coordinate within the size of the image, 2016×2018 for example, is generated to determine its position. In some embodiments, the cluster is normalized to a reasonable range, 0.8 to 1.0 for example, and the corresponding pixels will be scaled by the values in the generated cluster.

In step S1003, the cluster calcification signal generated in step S1002 is stored. For example, in some embodiments, the cluster calcification signal is stored in the storage 206. In some embodiments, the cluster calcification signal is stored in a network storage device accessible via a network (such as a local area network and/or via the Internet). Then the flow proceeds to step S1004.

In step S1004 the computing system 200 determines whether to generate another calcification signal. If another calcification signal is to be generated (Yes in step S1004), the flow proceeds to step S1001 and the process of FIG. 10 is repeated. For example, the computing system 200 generates another cluster calcification signal in step S10001 and S1002 and stores the cluster calcification signal in step S1003. On the other hand, if the computing system 200 determines in step S1004 that no other cluster calcification signal is to be created (No in step S1004), the flow ends. Thus, by virtue of performing the processing of FIG. 10 multiple cluster calcification signals are generated and stored.

FIG. 11 illustrates an example operational flow for adding the calcification signals generated in FIG. 9 and the cluster calcification signals generated in FIG. 10 to images to generate an initial training dataset. For example, the computing system 200 may add the calcification signals generated in FIG. 9 and/or the cluster calcification signals generated in FIG. 10 to the combined images in the combined image dataset generated in FIG. 8 to generate an initial training dataset. In some embodiments, one or more of the steps of FIG. 11 are performed at the computing system 200 by executing program instructions of one or more application(s) on the computing system 200. In some embodiments, the initial training dataset generated in FIG. 11 are stored in the storage 206. In some embodiments, the initial training dataset generated in FIG. 11 are stored on one or more network storage devices accessible via a network (such as a local area network and/or via the Internet).

In step S1101, calcification signals generated by the process of FIG. 9 are added to a combined image in the combined image dataset generated by the process of FIG. 8. For example, in step S1101, a subset of the calcification signals stored in the processing of FIG. 9 may be added to one of the combined images generated in the processing of FIG. 8.

In some embodiments, step S1101 includes generating an image of the same size as the X-ray image data, for example 2016×2816, and setting all pixel values to one. Then the computing system 200 generates random coordinates within the range of the X-ray image data. The computing system 200 places calcification signals generated in FIG. 9 at the coordinates and sets the pixel values inside each calcification signal to be a smaller value, for example 0.8 or 0.9. Then, according to some embodiments, the computing system 200 dot multiplies the generated image and the combined image data generated in FIG. 8 to generate the initial training dataset including calcification signals.

Figure 12A:
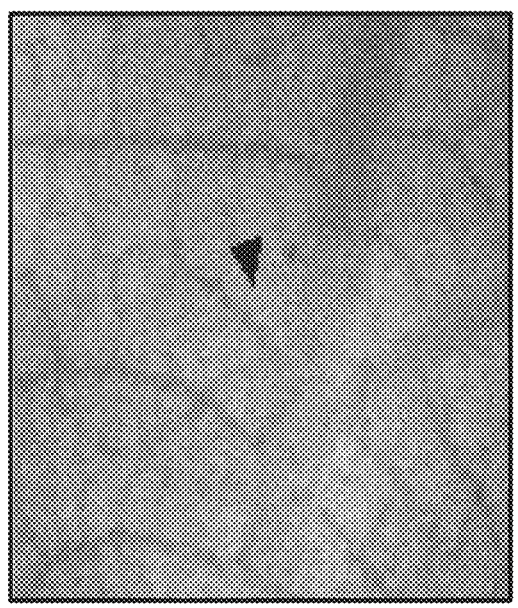
FIGS. 12A, 12B, and 12C illustrate examples of training data including calcification signals overlaid on combined image data.
Figure 12B:
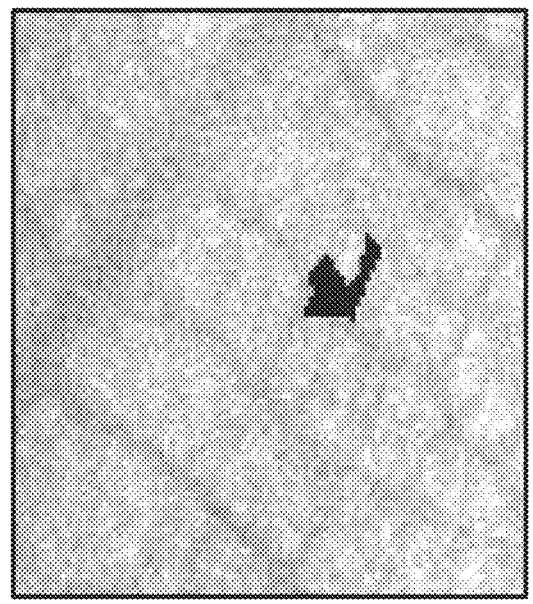
Figure 12C:

FIGS. 12A, 12B, and 12C illustrate example calcification signals overlaid on combined image data. For example, FIGS. 12A, 12B, and 12C each depict a unique calcification signal added to a position on a respective combined image. FIGS. 12A to 12C illustrate examples of the result of the processing performed at step S1101 when calcification signals are added to the combined image data generated in FIG. 8.

In step S1102, cluster calcification signals generated by the process of FIG. 10 are added to a combined image in the combined image dataset generated by the process of FIG. 8. For example, in step S1102, a subset of the cluster calcification signals stored in the processing of FIG. 10 may be added to one of the combined images generated in the processing of FIG. 8.

In some embodiments, step S1102 includes generating an image of the same size as the X-ray image data, for example 2016×2816, and setting all pixel values to one. Then the computing system 200 generates random coordinates within the range of the X-ray image data. The computing system 200 places cluster calcification signals generated in FIG. 10 at the coordinates and scales the pixel values inside each cluster calcification signal to be within a range, for example 0.8 to 1. Then, according to some embodiments, the computing system 200 dot multiplies the generated image and the combined image data generated in FIG. 8 to generate the initial training dataset including the cluster calcification signals.

Figure 13B:
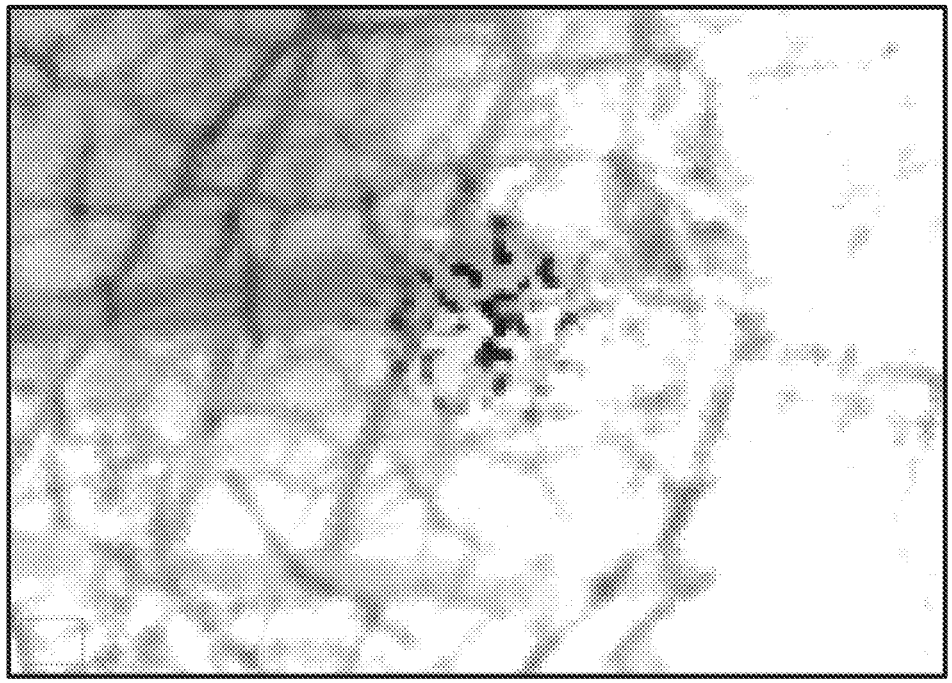
FIG. 13B illustrates example training data including cluster calcification signals overlaid on combined image data.
Figure 13A:
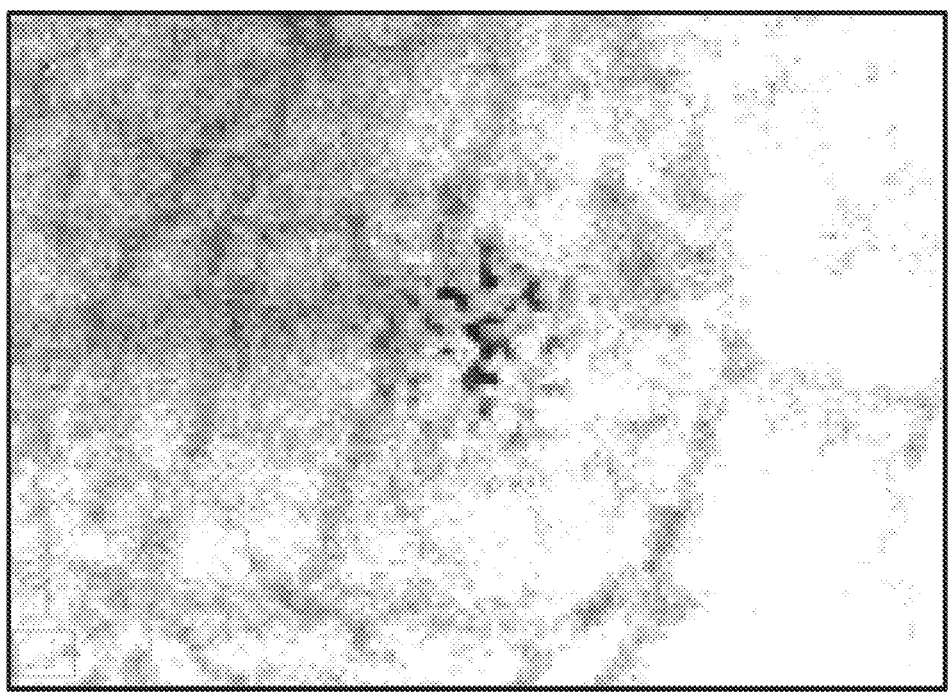
FIG. 13A illustrates example training data generated by applying a system noise model to the combined image data including cluster calcification signals of FIG. 13B.

FIG. 13B illustrates an example cluster calcification signal overlaid on combined image data. For example, FIG. 13B depicts a unique cluster calcification signal added to a position on a combined image. FIG. 13B illustrates an example of the result of the processing performed at step S1102 when calcification signals are added to the combined image data generated in FIG. 8. FIG. 13A illustrates example training data generated by applying a system noise model to the combined image data of FIG. 13B including cluster calcification signals.

According to some embodiments, the processing of step S1101 and S1102 is applied to the same combined image data. That is, in some embodiments, single calcification signals are added to a combined image in step S1101 and cluster calcification signals are added to the combined image in step S1102.

In step S1103, the initial training data generated by applying steps S1101 and S1102 is stored. For example, in some embodiments, the initial training data is stored in the storage 206. In some embodiments, the initial training data is stored in a network storage device accessible via a network (such as a local area network and/or via the Internet). Then the flow proceeds to step S1104.

In step S1104 the computing system 200 determines whether another combined image is present among the combined image dataset generated in FIG. 8. If another combined image is present (Yes in step S1104), the flow proceeds to step S1101 and the process of FIG. 11 is repeated. For example, the computing system 200 generates another combined image including calcification signals and cluster calcification signals in steps S1101 and S1102 and stores the combined image having calcification signals and cluster calcification signals in step S1103. On the other hand, if the computing system 200 determines in step S1104 that no other combined image remains in the combined image dataset (No in step S1104), the flow ends. Thus, by virtue of performing the processing of FIG. 11 an initial training dataset including multiple combined images including calcification signals is generated and stored.

According to some embodiments, the initial training dataset generated by the processing of FIG. 11 is used as target data for training a machine-learning model. For example, the machine-learning model may be trained with the initial training dataset generated in FIG. 11 as training data for an output side of the machine-learning model.

Figure 14:
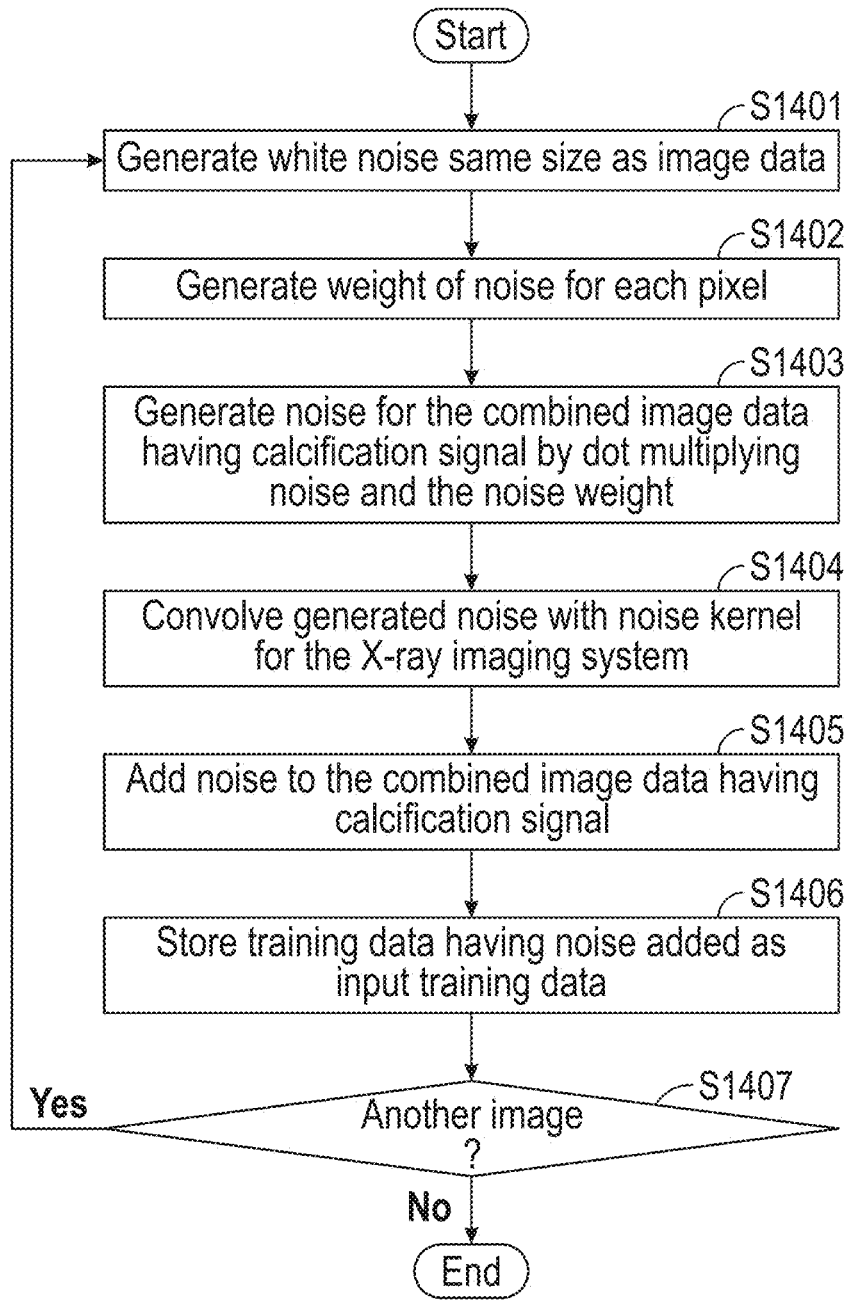
FIG. 14 illustrates an example operational flow for generating training data by adding noise to combined image data including superimposed calcification signals.

FIG. 14 illustrates an example operational flow for applying a system noise model to the initial training dataset generated in FIG. 11. In some embodiments, one or more of the steps of FIG. 14 are performed at the computing system 200 by executing program instructions of one or more application(s) on the computing system 200. In some embodiments, the training dataset to which the system noise model has been applied in FIG. 14 is stored in the storage 206. In some embodiments, the training dataset to which the system noise model has been applied in FIG. 14 is stored on one or more network storage devices accessible via a network (such as a local area network and/or via the Internet). The training data generated by the processing of FIG. 14 is an example of the training data 21 described in FIG. 1.

In step S1401, the computing system 200 generates white noise of the size of the X-ray image data, for example, 2016×2816. In step S1402, the computing system 200 generates a weight of noise for each pixel based on a noise curve measured from the medical imaging apparatus 110 and a combined image included in the initial training dataset generated in FIG. 11. In step S1403, the computing system 200 generates the noise for the combined image included in the initial training dataset by dot multiplying the white noise and the noise weight. In step S1404, the computing system 200 convolves the generated noise with noise kernel measured from the medical imaging apparatus 110. In step S1405, the computing system adds the generated noise with the kernel to the clean images of the initial training dataset generated in FIG. 11 to create noisy images.

In step S1406, the training data to which the system noise model has been applied is stored. For example, in some embodiments, the training data is stored in the storage 206. In some embodiments, the training data is stored in a network storage device accessible via a network (such as a local area network and/or via the Internet). Then the flow proceeds to step S1407.

In step S1407 the computing system 200 determines whether another image is present among the initial training dataset generated in FIG. 11. If another image is present (Yes in step S1407), the flow proceeds to step S1401 and the process of FIG. 14 is repeated. For example, the computing system 200 generates another image by applying the system noise model and stores the image to which the system noise model has been applied. On the other hand, if the computing system 200 determines in step S1407 that no other image remains in the initial training dataset (No in step S1407), the flow ends. Thus, by virtue of performing the processing of FIG. 14, a training dataset to which the system noise model has been applied is generated and stored.

According to some embodiments, the training dataset to which the system noise model has been applied generated by the processing of FIG. 14 is used for training a machine-learning model. For example, the machine-learning model may be trained with the training dataset to which the system noise model has been applied generated in FIG. 14 as training data for an input side of the machine-learning model. The training data generated by the process of FIG. 14 includes the image shown in FIG. 5A and the image shown in FIG. 13A, for example.

In FIG. 13A, an example cluster calcification signal is overlaid on combined image data and a system noise model is applied to the combined image. For example, FIG. 13B shows the cluster calcification signal added to the combined image. That is, FIG. 13A illustrates an example of training data for an input side of a machine-learning model. FIG. 13B, on the other hand, illustrates an example of training data for an output side of the machine-learning model.

Further by way of example, FIG. 5A illustrates example input training data for training a machine-learning model. For example, FIG. 5A depicts a combined image generated by the processing of FIG. 8 after adding calcification signals by the processing of FIG. 11 and applying the system noise model of FIG. 14. The image depicted in FIG. 5A is used as training data for an input side of a machine-learning model.

FIG. 5B illustrates example target training data for training a machine-learning model. For example, FIG. 5B depicts a combined image generated by the processing of FIG. 8 after adding calcification signals by the processing of FIG. 11. The image depicted in FIG. 5B is used as training data for an output side of a machine-learning model.

According to some embodiments, the machine-learning model is a convolutional neural network (CNN). In some embodiments, the neural network is a U-Net neural network. The neural network may be any suitable neural network such as, for example, a residual network (ResNet), dense convolutional network (DenseNet), a Visual Geometry Group (VGG) neural network, Attention Based CNN, or other suitable neural network.

Figure 15:
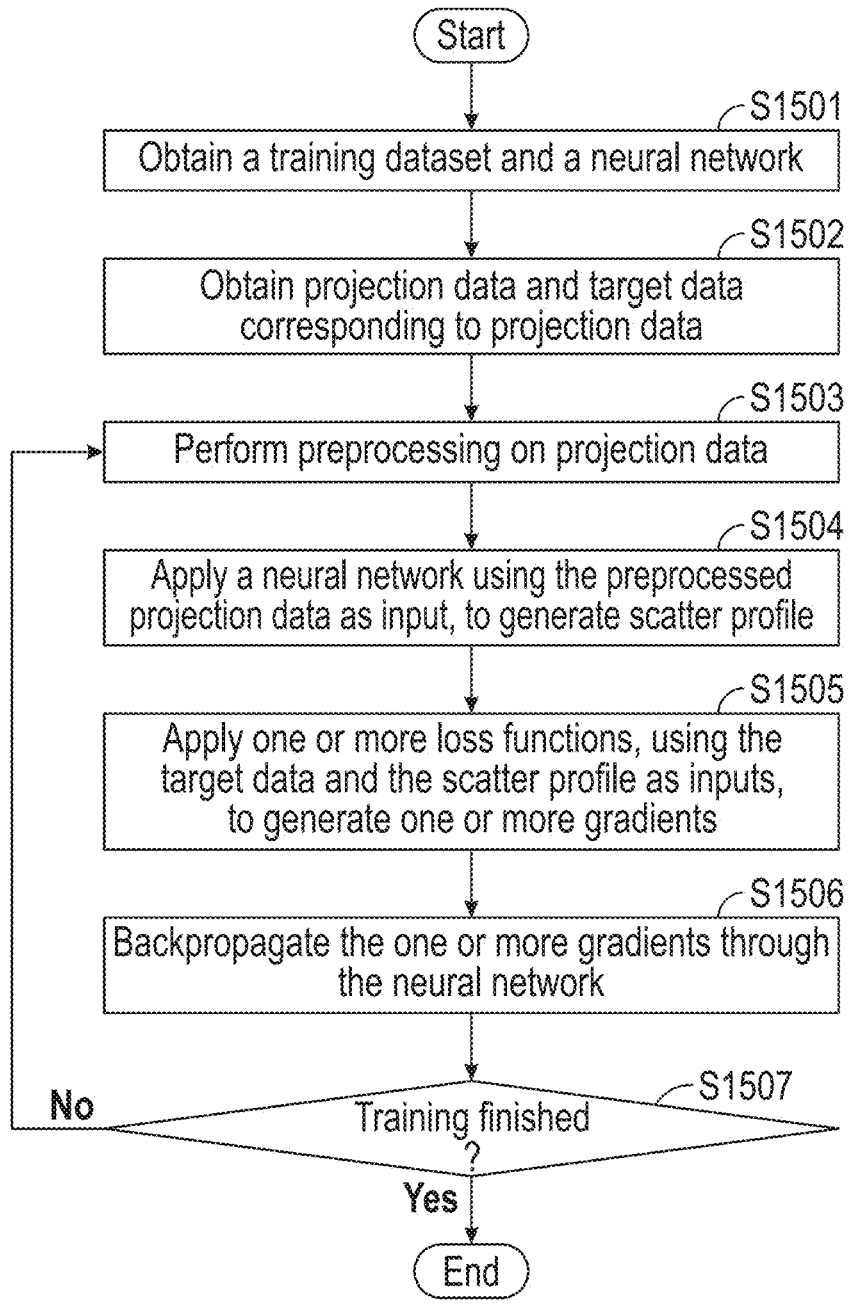
FIG. 15 illustrates an example embodiment of a neural network training process.

FIG. 15 illustrates an example embodiment of a neural network training process. The flow begins in step S1501 where a neural-network-training device obtains (e.g., retrieves from storage, receives from another device) a training dataset and a neural network. Next, in step S1502, the neural-network-training device selects a projection dataset and target data from the training dataset. The projection dataset and the target data correspond to each other.

The flow then moves to step S1503, where the neural-network-training device performs preprocessing on projection data (detected X-ray image data) from the projection dataset. The flow then advances to S1504, where the neural-network-training device applies one or more neural networks, using the preprocessed projection data as an input, to generate a scatter profile corresponding to the projection data.

The flow then moves to S1505, where one or more loss functions are applied using the target data and the scatter profile as inputs, to generate one or more gradients. When a scatter profile is input into the loss function, the loss function outputs a loss value. According to some embodiments, the loss function is applied only in the breast region. Mammography images are composed of breast region and air region. In some X-ray images, the air region can potentially be bigger than the breast. Therefore, according to some embodiments, in the training, the loss function is performed only in the breast region to ensure the performance of the neural network. Otherwise, the loss may be dominated by the air region and the learning ability of the algorithm in the breast area may be heavily impacted in a negative way. Thus, in some embodiments, because the air region is saturated and has the maximum gray value, a gray value threshold is applied to mask the air region out in loss computation. That is, by applying a greyscale threshold, pixels that have gray values above a predefined threshold are determined to be the region outside the breast region in the X-ray image. Then, a mask is used on the region outside the breast region when applying the loss function. Thus, according to some embodiments, in step S1505, one or more loss functions are applied with respect to the breast region after the gray value threshold is applied to mask out the air region.

Next, in S1506, the neural-network-training device back-propagates the one or more gradients through the neural network.

Then, in S1507, it is determined if the training of the neural network is finished (e.g., if predefined stopping criteria are satisfied). If the neural-network-training device determines that the training of the neural network is not finished (No in step S1507), then the flow returns to S1503, where the preprocessing is performed on projection data, which may or may not have previously been processed. After the backpropagation is finished, the training process in FIG. 15 can be repeated. The training process can be repeated until predefined stopping criteria, which are used to determine whether the training of the one or more neural networks is complete, are satisfied. For example, the predefined stopping criteria can evaluate whether the new error (e.g., loss value) or the total number of iterations performed exceed predefined values. For example, the stopping criteria can be satisfied if either the new error falls below a predefined threshold or if a maximum number of iterations is reached. In some embodiments, determining whether the training is finished is based on loss values calculated with respect to the breast region.

In some embodiments, if the neural-network-training device determines that the training of the neural network is not finished (No in step S1507), the flow may return to S1502, where a projection dataset is selected and target data from the training dataset. The selected projection dataset and target data may or may not have been previously selected.

If the neural-network-training device determines that the training of the neural network is finished (Yes in step S1507), then the flow ends.

In some embodiments, the neural-network-training device may perform the operations in FIG. 15 for each neural network of a plurality of neural networks. And each of the neural networks may have a respective training dataset. Also, each neural network's training dataset may be unique to that neural network.

Figure 16:
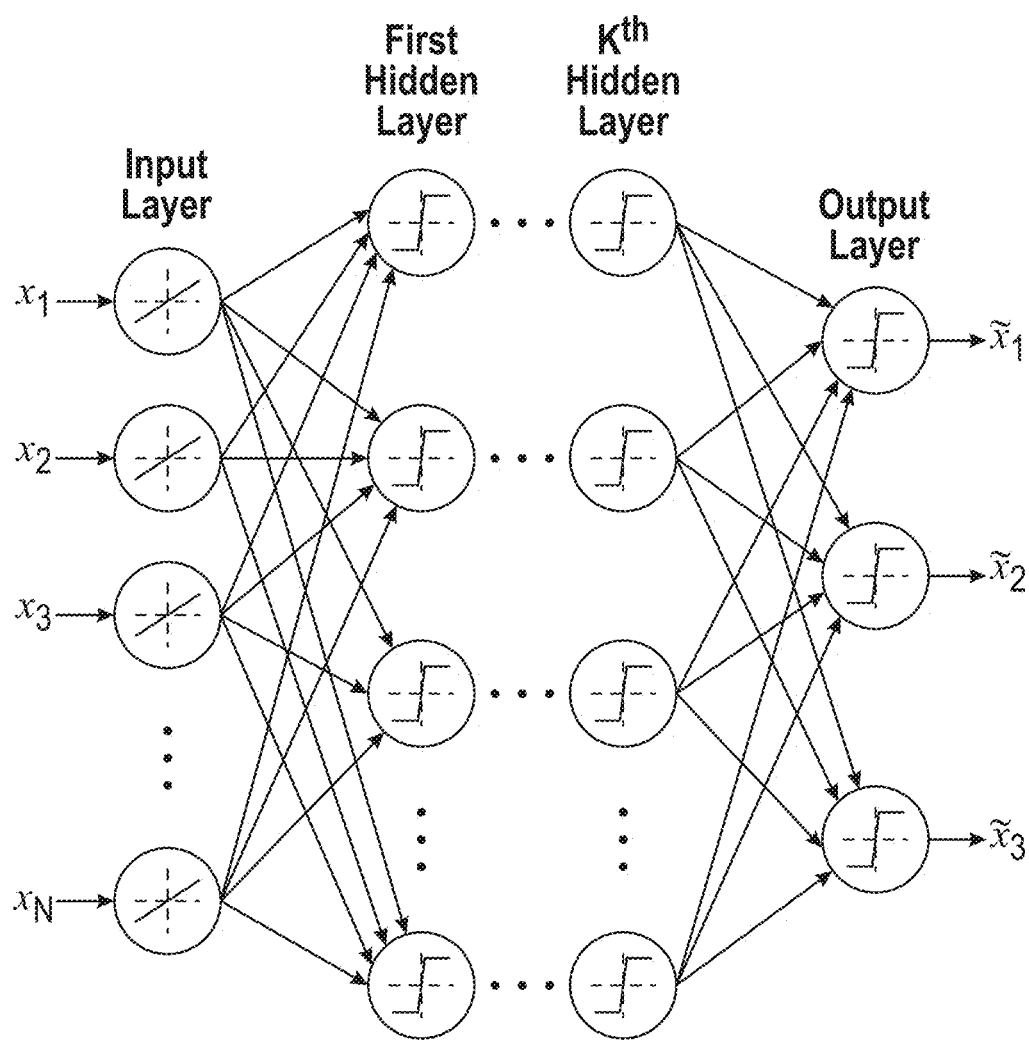
FIG. 16 illustrates an example embodiment of a neural network.

FIG. 16 illustrates an example embodiment of a neural network. The neural network is an artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture, such as the number of nodes or their connectivity. The nodes in an ANN can be referred to as neurons (or as neural nodes), and the neurons can have inter-connections between the different layers of the ANN system. The simplest ANN has three layers, and is called an autoencoder. The neural network may have more than three layers of neurons, and may have as many outputs neurons IN as input neurons. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) can be described as a composition of other functions $n_i(x)$, which can further be described as a composition of other functions. This can be conveniently represented as a network structure, with arrows depicting the dependencies between variables, as shown in FIG. 16. For example, the ANN can use a nonlinear weighted sum, such as $m(x)=K(\Sigma_i w_i n_i(x))$, where K (commonly referred to as the activation function) is some predefined function (e.g., a hyperbolic tangent), and where $w_i$ is the weight of corresponding function $n_i(x)$.

In FIG. 16 (and similarly in FIG. 17), the neurons (i.e., nodes) are depicted by circles around a threshold function. For the non-limiting example shown in FIG. 16, the inputs are depicted as circles around a linear function, and the arrows indicate directed connections between neurons. In certain implementations, the neural network is a feedforward network as exemplified in FIGS. 16 and 17 (e.g., it can be represented as a directed acyclic graph).

The neural network operates to achieve a specific task, such as generating a scatter distribution, by searching within the class of functions F to learn, using a set of observations, to find $m^* \in F$ which solves the specific task in some optimal sense (e.g., the stopping criteria discussed above). For example, in certain implementations, this can be achieved by defining a cost function $C:F \to \mathbb{R}$ such that, for the optimal solution $m^*$, $C(m^*) \leq C(m) \forall m \in F$ (i.e., no solution has a cost less than the cost of the optimal solution). The cost function is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 17:
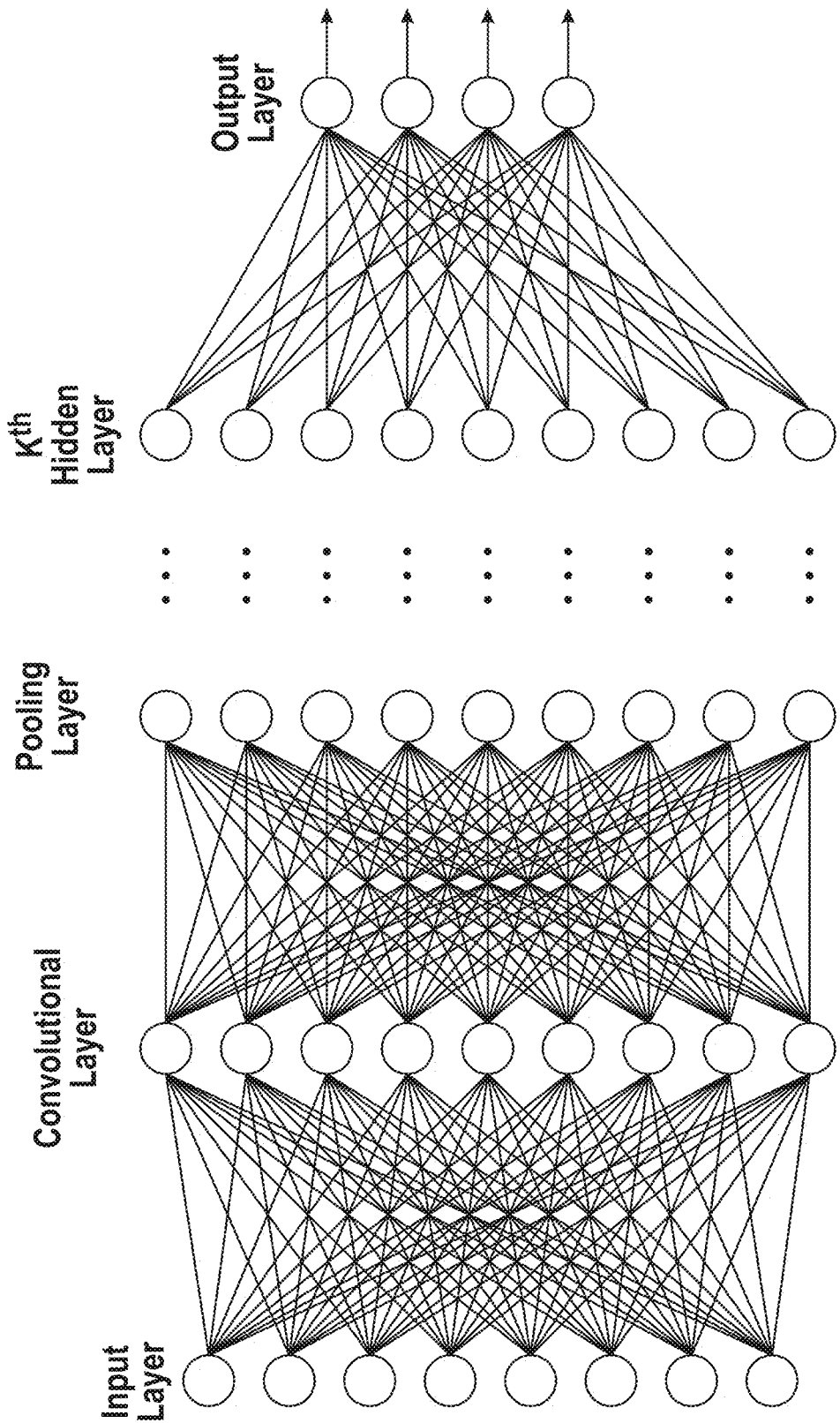
FIG. 17 illustrates an example embodiment of a convolutional neural network (CNN).

In some embodiments, the neural network is a convolutional neural network (CNN), and FIG. 17 shows an example embodiment of a CNN. CNNs use feed-forward ANNs in which the connectivity pattern between neurons can represent convolutions. For example, CNNs can be used for image-processing optimization by using multiple layers of small neuron collections that process portions of the input data (e.g., projection data), called receptive fields. The outputs of these collections can then be tiled so that they overlap. This processing pattern can be repeated over multiple layers having alternating convolution and pooling layers.

Figure 18:
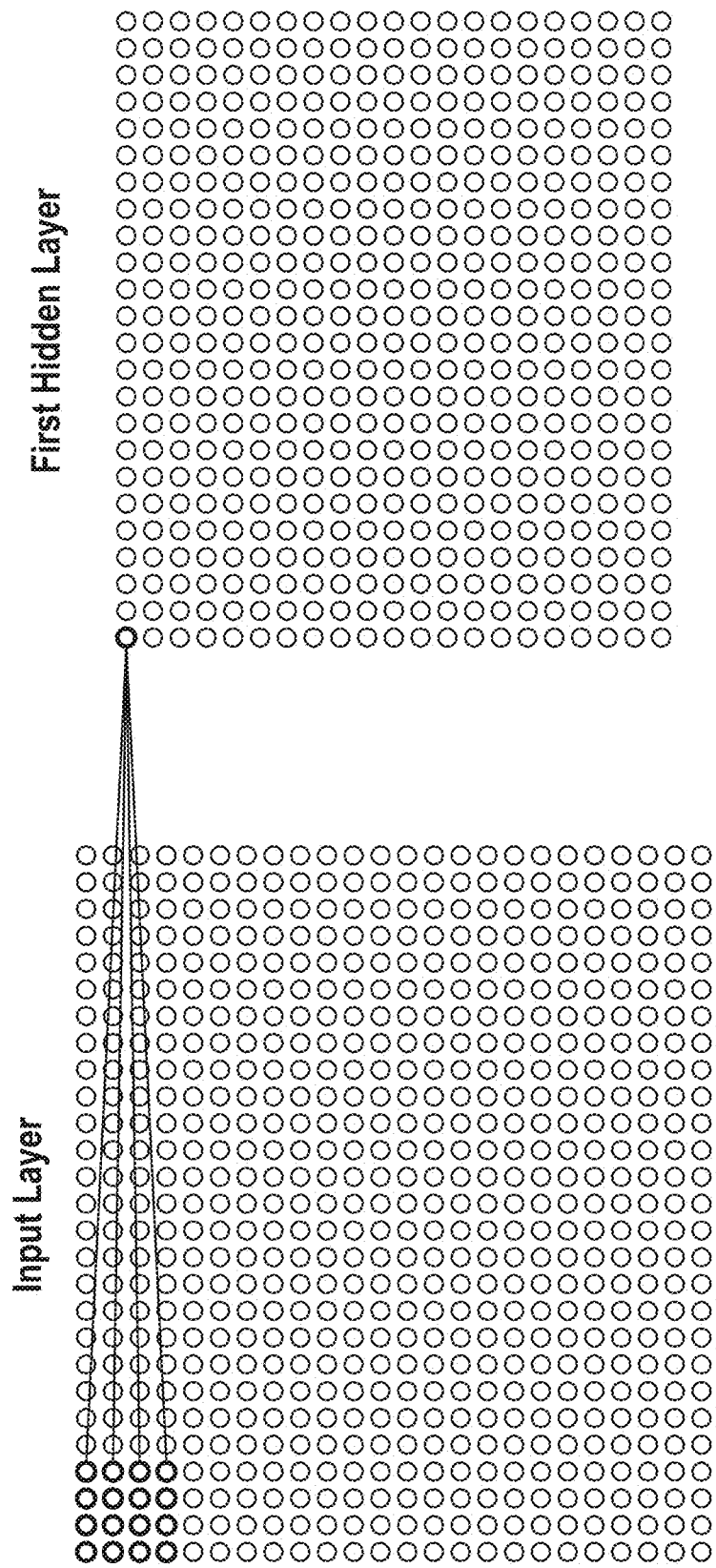
FIG. 18 illustrates an example of implementing a convolution layer for one neural node of the convolution layer, according to an example embodiment.

FIG. 18 illustrates an example of implementing a convolution layer for one neural node of the convolution layer, according to an example embodiment. FIG. 18 shows an example of a 4×4 kernel being applied to map values from an input layer representing a two-dimensional image (e.g., a sinogram) to a first hidden layer, which is a convolution layer. The kernel maps respective 4×4 pixel regions to corresponding neurons of the first hidden layer.

Following a convolutional layer, a CNN can include local or global pooling layers, which combine the outputs of neuron clusters in the convolution layers. Additionally, in certain implementations, the CNN can also include various combinations of convolutional and fully-connected layers, with pointwise nonlinearity applied at the end of or after each layer.

Figure 19:
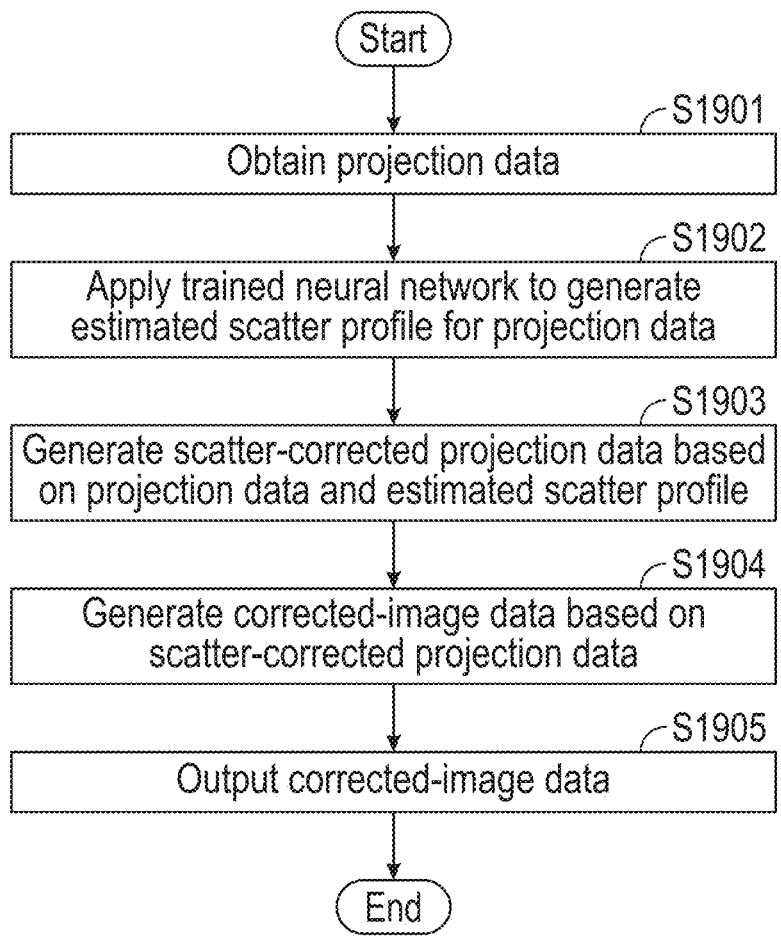
FIG. 19 illustrates an example embodiment of an image correction process using a trained neural network.

FIG. 19 illustrates an example embodiment of applying a trained neural network. For example, the processing of FIG. 19 may be performed using the trained neural network 30 shown in FIG. 1. Further by way of example, the processing of FIG. 19 may be performed by the computing system 200 using the trained neural network 30 stored in the storage 206, as depicted in FIG. 3. According to some embodiments, the processing of FIG. 19 may be performed by the medical image processing apparatus 140 using the trained neural network 30 stored in the storage 146, as depicted in FIG. 4. According to some embodiments, the process of FIG. 19 is an example of the image correction process 45 described in FIG. 1. The image correction process of FIG. 19 is performed using the trained neural network 30. After the neural network has been trained, the network can be used to predict scatter profile for projection images view by view.

In step S1901, projection data is obtained. The projection data may be X-ray image data received from the medical imaging apparatus 110. In some embodiments, an X-ray image obtained of a breast including calcification is received. For example, the X-ray image with calcification features 41 may be received as an input to the trained neural network 30.

In step S1902, applying the trained neural network generates an estimated scatter profile for projection data. Specifically, the scatter profile for the X-ray image data received in step S1901. In step S1903, scatter-corrected projection data is generated based on the projection data obtained in step S1901 and the estimated scatter profile generated in step S1902. Then, in step S1904, corrected image data is generated based on the scatter-corrected projection data of step S1903. In some embodiments, the corrected image data generated in step S1904 includes less noise than the image for which data was received in step S1901. For example, in some embodiments, the estimated scatter profile generated by the trained neural network in step S1902 is used in the generation of the corrected image data to produce a corrected image in which noise is reduced. The corrected image data is then output in step S1905. Outputting the corrected image data in step S1905 may include sending the image data to a display, such as the display 203 or the display 143 to be displayed. The corrected image data of step S1905 may also be stored and/or transmitted via the network 160 to another computing device or system.

In some embodiments, the process of FIG. 19 is implemented to reconstruct an image. For example, according to some embodiments, the scatter-corrected projection data generated in step S1903 based on the estimated scatter profile output by the trained neural network, is used to generate reconstructed-image data in step S1904. Then, reconstructed-image data may be output in step S1905, according to some embodiments.

Figure 20B:
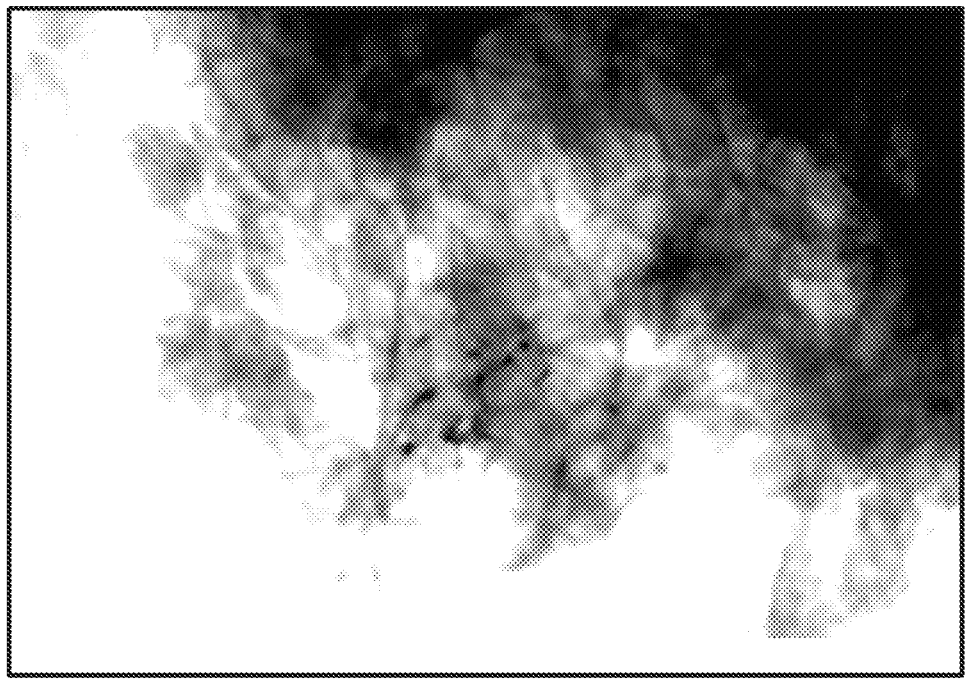
FIG. 20B illustrates an output image after an image correction process using a trained neural network that was trained with calcification simulation in training data.
Figure 20A:
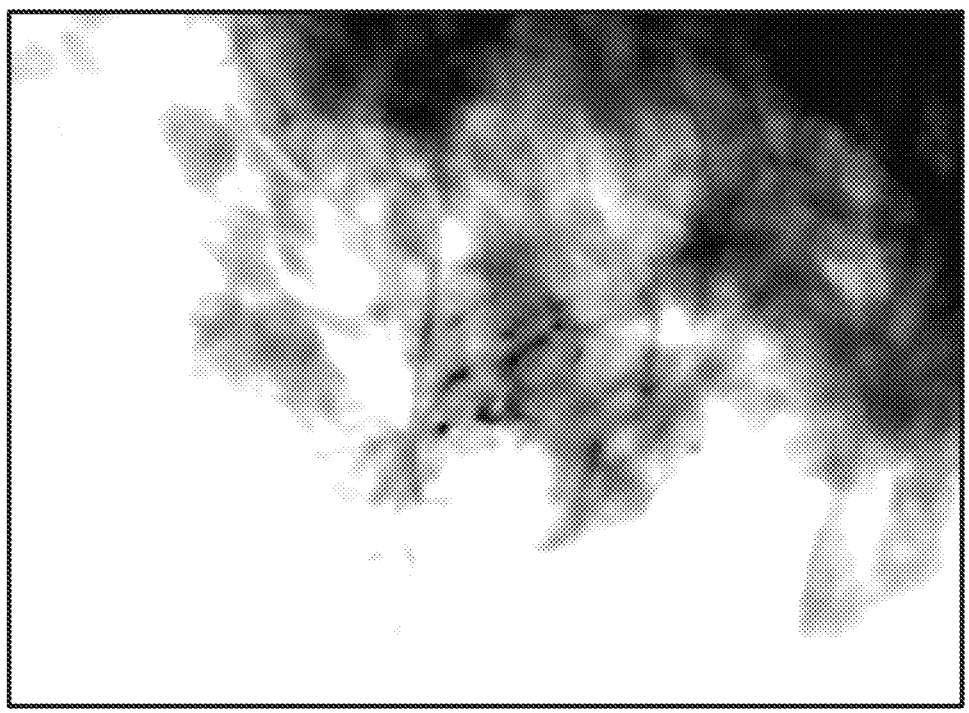
FIG. 20A illustrates an output image after an image correction process using a trained neural network that was trained without calcification simulation in training data.

FIGS. 20A and 20B illustrate images which have been processed by a trained neural network. For example, the image data of FIG. 20B may be output in step S1905 to a display.

FIG. 20A illustrates an output image after an image correction process using a trained neural network that was trained without calcification simulation in training data. For example, unlike the trained neural network 30 which is trained using the training data generated in FIG. 11 which includes the calcification data, a different trained neural network which was not trained using the calcification signals is used to generate the image of FIG. of 20A.

FIG. 20B, on the other hand, illustrates an output image after an image correction process using a trained neural network that was trained with calcification simulation in training data, such as the training dataset 20. FIGS. 5A and 5B and FIGS. 13A and 13B include examples of training data including superimposed data representing calcification signals.

The images shown in FIGS. 20A and 20B were generated based on the same input image. For example, the same X-ray image data including noise was received as the input image data for both the output image of FIGS. 20A and 20B. The noise reduction in FIG. 20B exceed that of the noise reduction in FIG. 20A. Moreover, the enhanced sharpness and contrast of calcifications signals in FIG. 20B relative to FIG. 20A is also illustrated.

The above description serves to explain principles of the disclosure; but the disclosure should not be limited to the examples described above. For example, the order and/or timing of some of the various operations may vary from the examples given above without departing from the scope of the disclosure. Further by way of example, the type of network and/or computing systems may vary from the examples given above without departing from the scope of the disclosure. Other variations from the examples given above may also exist without departing from the scope of the disclosure. For example, various features of the illustrated examples could be modified, rearranged, or removed, or one or more features could be added without departing from the scope of the disclosure.

The scope of the present disclosure includes a computer-readable medium storing instructions that, when executed by one or more processors, cause the one or more processors to perform one or more embodiments of the disclosure described herein. Examples of a computer-readable medium include a hard disk, a floppy disk, a magneto-optical disk (MO), a compact-disk read-only memory (CD-ROM), a compact disk recordable (CD-R), a CD-Rewritable (CD- RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Thus, the scope of the claims is not limited to the above-described embodiments and includes various modifications and equivalent arrangements.

What is claimed is:

1. A method of generating training data for training a machine-learning model, the method comprising:
    obtaining first X-ray image data acquired by irradiating with X-rays a breast of an object, the first X-ray image data including an X-ray image of the breast;
    obtaining photographic image data, wherein the photographic image data does not include a photographic image of a breast;
    generating combined image data based on the first X-ray image data and the photographic image data, the combined image data being generated by combining at least a portion of the first X-ray image data with at least a portion of the photographic image data;
    generating calcification signal data for simulating calcification; and
    generating training data for training a machine-learning model for outputting information based on second X-ray image data, the training data being generated by adding the calcification signal data to the combined image data.

2. The method of claim 1, wherein the combined image data including the calcification signal data is used as target data in training the machine-learning model.

3. The method of claim 2, wherein the trained machine-learning model is used for generating a noise-reduced image corresponding to the second X-ray image data.

4. The method of claim 1, wherein in generating the combined image data, a contour line of the breast and a background component in the first X-ray image data and a textural feature in the photographic image data are combined.

5. The method of claim 1, wherein the photographic image data includes a feature that simulates one or more features characteristic of a mammographic image.

6. The method of claim 1, wherein generating the training data includes superimposing data having a characteristic related to a lesion onto the combined image data, the data having the characteristic related to the lesion comprising the calcification signal data.

7. A medical image processing apparatus comprising:
    processing circuitry configured to perform noise reduction by inputting an input image of a breast into a trained machine-learning model to output an output image in which noise included in the input image is reduced in the output image while leaving a characteristic of a lesion included in the input image undeleted in the output image,
    wherein the trained machine-learning model, for reducing noise in an image while leaving a characteristic of a lesion included in the image undeleted, is generated by training a machine-learning model with a first image as training data for an output side of the machine-learning model, and a second image as training data for an input side of the machine-learning model,
    the first image is generated by:
        generating combined image data based on first image data including an image of a breast of an object and second image data not including an image of a breast, the combined image data being generated by combining at least a portion of the first image data with at least a portion of the second image data,
        generating calcification signal data for simulating calcification, and
        adding the calcification signal data to the combined image data to generate the first image,
    the first image includes a characteristic of the lesion, and
    the second image includes higher noise than the first image and includes the characteristic of the lesion included in the first image.

8. The medical image processing apparatus of claim 7, wherein the training includes identifying a region outside a breast region in the training data and determining whether training is finished based on information corresponding to the breast region.

9. The medical image processing apparatus of claim 8, wherein the region outside the breast region is identified based on values of pixels in the region outside the breast region exceeding a threshold.

10. The medical image processing apparatus of claim 8, wherein the determining whether the training is finished is based on loss values calculated with respect to the breast region.

11. The medical image processing apparatus of claim 7, wherein the image of the breast of the object is an X-ray image.

12. The medical image processing apparatus of claim 7, wherein the first image data is X-ray image data, and the image of the breast of the object is an X-ray image, and
    wherein the second image data is photographic image data, and the photographic image data does not include a photographic image of a breast.

13. The medical image processing apparatus of claim 7, wherein the second image is generated by adding noise to the first image,
    wherein the first image data is X-ray image data, and
    wherein the second image data is photographic image data.

* * * * *